US 12,546,580 B2

United States Patent
Bulled

(10) Patent No.: US 12,546,580 B2
(45) Date of Patent: Feb. 10, 2026

(54) MANUFACTURING METHOD AND APPARATUS

(71) Applicant: RENISHAW PLC, Wotton-under-Edge (GB)

(72) Inventor: Colin Ray Bulled, Crediton (GB)

(73) Assignee: RENISHAW PLC, Wotton-under-Edge (GB)

(*) Notice: Subject to any disclaimer, the term of this patent is extended or adjusted under 35 U.S.C. 154(b) by 1041 days.

(21) Appl. No.: 17/615,852

(22) PCT Filed: Jun. 5, 2020

(86) PCT No.: PCT/GB2020/051365
§ 371 (c)(1),
(2) Date: Dec. 2, 2021

(87) PCT Pub. No.: WO2020/245598
PCT Pub. Date: Dec. 10, 2020

(65) Prior Publication Data
US 2022/0307811 A1    Sep. 29, 2022

(30) Foreign Application Priority Data

Jun. 7, 2019  (GB) .................................. 1908127
Aug. 16, 2019  (GB) .................................. 1911755

(51) Int. Cl.
*G01B 5/016* (2006.01)
*B23P 21/00* (2006.01)
(Continued)

(52) U.S. Cl.
CPC ............ *G01B 5/016* (2013.01); *B23P 21/002* (2013.01); *B25J 9/0057* (2013.01); *B25J 9/1623* (2013.01);
(Continued)

(58) Field of Classification Search
CPC ...... G01B 5/016; G01B 11/005; G01B 5/008; G01B 21/042; G01B 21/047;
(Continued)

(56) References Cited

U.S. PATENT DOCUMENTS 6,024,526 A    2/2000  Slocum et al.
6,163,946 A *  12/2000  Pryor .................... B25J 9/1697
29/702

(Continued)

FOREIGN PATENT DOCUMENTS

CN    102207379 A    10/2011
CN    103250025 B    3/2017
(Continued)

OTHER PUBLICATIONS

Braddick, H.J.J., Mechanical Design of Laboratory Apparatus, Institute of Physics, 1960.
(Continued)

*Primary Examiner* — Yaritza Guadalupe-Mccall
(74) *Attorney, Agent, or Firm* — Oliff PLC

(57) ABSTRACT

A method of manufacturing an article, including using coordinate measuring machine both to obtain three-dimensional point coordinate measurements of first part of article in place and to position a second part of article in predetermined spatial relationship relative to first part in dependence upon measurements of first part. Predetermined spatial relationship is defined in more than three degrees of freedom. Positioning second part relative to first part includes controlling machine to move second part relative to first part in more than three degrees of freedom. Machine is controlled to hold first and second parts in predetermined spatial relationship while performing an operation to fix both parts in predetermined spatial relationship. Second part is not in direct contact with any other part of article when first and
(Continued)

second parts are in predetermined spatial relationship, at least not in a manner which would interfere with or influence or affect predetermined spatial relationship.

37 Claims, 13 Drawing Sheets

(51) Int. Cl.
  *B25J 9/00* (2006.01)
  *B25J 9/16* (2006.01)
  *B25J 13/08* (2006.01)
  *G01B 11/00* (2006.01)
(52) U.S. Cl.
  CPC .......... *B25J 9/1694* (2013.01); *B25J 13/089* (2013.01); *G01B 11/005* (2013.01)
(58) Field of Classification Search
  CPC ...... B23P 21/002; B25J 9/0057; B25J 9/1623; B25J 9/1694; B25J 13/089; B25J 19/02; H05K 13/082
  See application file for complete search history.

(56) References Cited

U.S. PATENT DOCUMENTS

| | | | |
|---|---|---|---|
| 6,266,869 B1 | 7/2001 | Tracy et al. | |
| 7,503,125 B2 | 3/2009 | Jordil et al. | |
| 7,752,766 B2 | 7/2010 | Ruck et al. | |
| 8,203,576 B2 | 6/2012 | Chang et al. | |
| 8,825,438 B2* | 9/2014 | Anderson | G01B 21/04 |
| | | | 702/150 |
| 8,931,183 B2 | 1/2015 | Jonas | |
| 9,863,751 B2 | 1/2018 | Hediger | |
| 10,706,562 B2* | 7/2020 | Haverkamp | G01B 5/008 |
| 11,274,913 B2* | 3/2022 | Mühlbacher | G01B 21/047 |
| 11,624,603 B2* | 4/2023 | Angood | G01B 5/0014 |
| | | | 33/503 |
| 11,774,228 B2* | 10/2023 | Haas | G01B 21/04 |
| | | | 702/83 |
| 11,846,497 B2* | 12/2023 | Ould | G01P 15/18 |
| 11,854,219 B2* | 12/2023 | Lankalapalli | G01B 11/2518 |
| 11,976,920 B2* | 5/2024 | Eckardt | G01B 11/005 |
| 12,055,388 B2* | 8/2024 | McMurtry | G01B 5/0016 |
| 12,112,498 B2* | 10/2024 | Lankalapalli | H04N 23/667 |
| 2008/0271332 A1* | 11/2008 | Jordil | G01B 21/047 |
| | | | 33/503 |
| 2012/0072170 A1* | 3/2012 | McKendrick | G01B 11/005 |
| | | | 702/150 |
| 2012/0127451 A1 | 5/2012 | Butler et al. | |
| 2012/0330453 A1* | 12/2012 | Samak Sangari | B25J 15/0616 |
| | | | 700/121 |
| 2014/0253720 A1 | 9/2014 | Li et al. | |
| 2015/0176956 A1 | 6/2015 | Pettersson et al. | |
| 2017/0216981 A1 | 8/2017 | Lee et al. | |
| 2019/0003823 A1 | 1/2019 | Hull | |
| 2022/0307811 A1* | 9/2022 | Bulled | B25J 9/1623 |
| 2023/0185208 A1* | 6/2023 | Jimbo | G06T 7/001 |
| | | | 355/75 |
| 2023/0280145 A1* | 9/2023 | Turner | G01B 5/012 |
| | | | 33/503 |
| 2023/0375321 A1* | 11/2023 | Mcmurtry | G01B 5/008 |
| 2024/0369340 A1* | 11/2024 | Mcmurtry | G01B 5/008 |

FOREIGN PATENT DOCUMENTS

| | | |
|---|---|---|
| DE | 100 55 185 A1 | 5/2002 |
| DE | 10 2010 016 215 A1 | 10/2011 |
| DE | 10 2018 206 967 A1 | 6/2018 |
| EP | 0 902 251 A2 | 3/1999 |
| EP | 1 988 357 A1 | 11/2008 |
| EP | 2 089 667 B1 | 7/2010 |
| EP | 3 392 002 A1 | 10/2018 |
| JP | H06-083977 B2 | 10/1994 |
| JP | 2009-269110 A | 11/2009 |
| JP | 2013-167572 A | 8/2013 |
| JP | 2019-021555 A | 2/2019 |
| WO | 2004/005849 A1 | 1/2004 |
| WO | 2005/059471 A1 | 6/2005 |
| WO | 2007/144573 A1 | 12/2007 |
| WO | 2009/115792 A1 | 9/2009 |
| WO | 2009/115794 A1 | 9/2009 |
| WO | 2015/049175 A1 | 4/2015 |
| WO | 2015/162431 A1 | 10/2015 |
| WO | 2017/174966 A1 | 10/2017 |
| WO | 2018/119451 A1 | 6/2018 |
| WO | 2018/150169 A1 | 8/2018 |
| WO | 2019/073246 A1 | 4/2019 |
| WO | 2021/116685 A1 | 6/2021 |

OTHER PUBLICATIONS

Skakoon, James G., "Exact Constraint: Knowing How Much is Enough—and How Much too Much—Is a Key to Successful Design," Mechanical Engineering, vol. 131, pp. 32-36, 2009.
Orsag, Matko et al., "Coordinate Systems and Transformations". Aerial Manipulation, pp. 19-31, 2008.
"Intro to Coordinate Metrology," Hexagon Manufacturing Intelligence, 13 pages.
"SMT placement equipment," Wikipedia, 4 pages.
Feb. 23, 2020 Search Report issued in British Application No. 1911755.5.
Sep. 1, 2020 Search Report issued in International Patent Application No. PCT/GB2020/051365.
Sep. 1, 2020 Written Opinion issued in International Patent Application No. PCT/GB2020/051365.

* cited by examiner

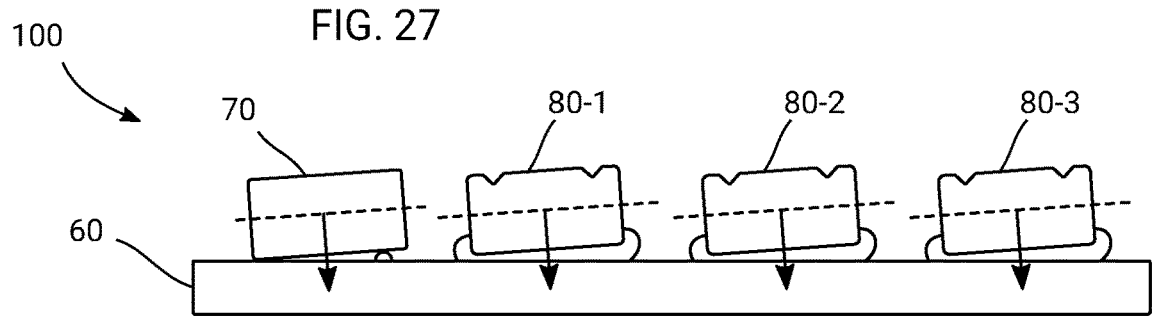
FIG. 27
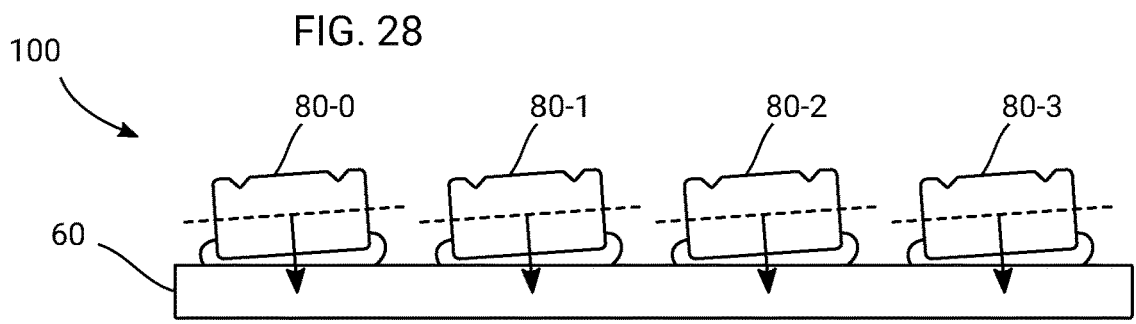
FIG. 28
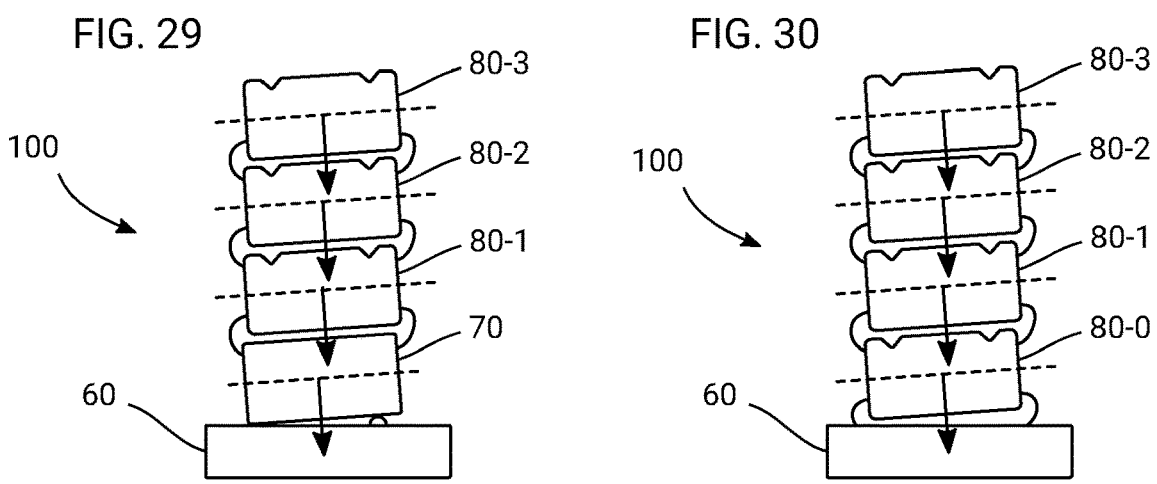
FIG. 29
FIG. 30
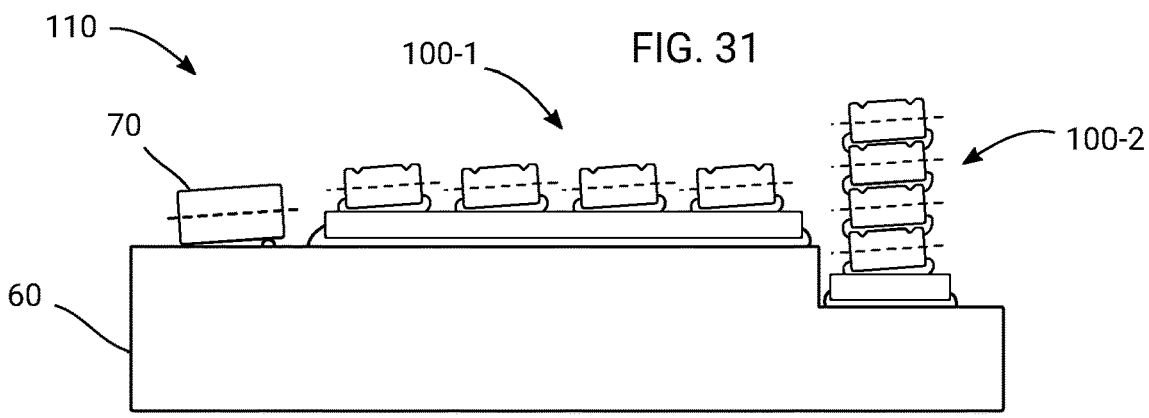
FIG. 31

MANUFACTURING METHOD AND APPARATUS

The present invention relates to a manufacturing method and manufacturing apparatus.

Apparatus for the automated assembly of components are known. For example, U.S. Pat. No. 6,266,869 describes an apparatus and associated method for assembling various components of a computer hard disk drive. In particular, U.S. Pat. No. 6,266,869 describes an assembly apparatus or robot comprising an arm that can be moved along three orthogonal axes (X, Y and Z). The moveable arm carries a vacuum collet for picking up components, an adhesive dispensing nozzle and an ultraviolet light source for curing deposited adhesive. Trays placed on the flat bed of the apparatus carry a plurality of components that are to be assembled. In use, adhesive is first dispensed onto a selected region of a first component using the glue nozzle. A second component is then picked up by the vacuum collet and placed onto the first component. The components are imaged by a local imaging system to establish their position relative to each other. The adhesive is then cured using UV radiation from the UV light source. In this manner, the various sub-assemblies of the hard drive can be automatically assembled. Although automated assembly apparatus of the type described in U.S. Pat. No. 6,266,869 allows automated assembly of certain components, the capability of such apparatus to assemble complicated structures with high accuracy is limited.

It has also been proposed previously to perform component placement using a Stewart platform or hexapod. For example, DE10055185 describes a technique for placing components on a substrate mounted on a rotatable table using a hexapod. However, in common with U.S. Pat. No. 6,266,869, the ability to perform high-precision automated manufacture of complicated articles using such apparatus is limited.

According to a first aspect of the present invention, there is provided a method of manufacturing an article, the method comprising using a coordinate measuring machine both to obtain (coordinate) measurements of a first (already-assembled) part of the article and to position a second part of the article in a predetermined spatial relationship relative to the first part in dependence upon the (coordinate) measurements of the first part.

A coordinate measuring machine is specifically adapted for measuring point coordinates of an object, and is to be distinguished from a positioning machine which is provided to position a component (e.g. supported on a moveable platform of the machine) within the working volume of the machine. Such a positioning machine is specifically adapted for the task of positioning or placing objects and is not specifically adapted to perform a measurement function, at least not to measure point coordinates on the surface of an object. Common examples of positioning machines are pick-and-place machines that are used for example in the PCB manufacturing industry, which blindly pick up parts from a tray and place those parts onto the PCB substrate. Some sort of registration process is required to ensure that the machine is picking up from the right place and that the PCBs are is where the machine expects them to be, for example using reference features or fiducials, but the pick-and-place machine does not perform any measurement of the parts already on the PCB and in particular does not rely on such measurements when placing subsequent components.

An embodiment of the present invention can be considered to be a metrology-assisted manufacturing method, in which a coordinate measuring machine (or metrology machine) is used for its primary purpose of measuring a part with high accuracy, but is also given an additional function of placing or positioning other parts relative to the measured part based on the measurements made. With such a technique, the accuracy of the manufacturing method is limited only by the accuracy of the coordinate measuring machine itself, and does not rely for example on complicated and/or expensive fixturing systems. Furthermore, in a preferred embodiment where the part being placed or assembled onto the article is held away from the surface of the article and fixed in place e.g. by applying and curing a curable adhesive in the gap, the substrate onto which the parts are being placed need not be particularly accurately formed or held, because the relative positioning of the parts being assembled onto the substrate is determined entirely by the accuracy of the metrology from the coordinate measuring machine, completely independent of the substrate or fixturing; the parts effectively "float" above the substrate in the correct relative positions based on the accuracy of the coordinate measuring machine. This novel use of a coordinate measuring machine provides a significant manufacturing advantage.

The first part of the article may be or may comprise a feature (e.g. an integral feature) of the article, with the second part being positioned relative to that feature. In other words, the first part is not necessarily one which is separable from (or which has previously been assembled or placed onto) the article; instead, the first part may simply be an integral part of the article, such as a bore, recess, protrusion or other such geometrical shape or feature formed on or in the surface of the article.

The method may comprise using the coordinate measuring machine to obtain (coordinate) measurements of the second part, with the second part being positioned in the predetermined spatial relationship relative to the first part in dependence upon the (coordinate) measurements of the first and second parts.

The measurements of the first part may be used to establish a frame of reference for the first part; the measurements of the second part may be used to establish a frame of reference for the second part; a relationship may be established between the first and second frames of reference; and the established relationship may be used to move the first and second parts into the predetermined spatial relationship in a common frame of reference.

Establishing the relationship between the first and second frames of reference may comprise determining positional information relating to at least one point or feature that is common to or coincident in both frames of reference.

The common frame of reference may be the frame of reference of the first part.

The first and second frames of reference may be first and second coordinate systems, respectively. The established relationship may be a coordinate transform between the first and second coordinate systems.

The predetermined spatial relationship may be defined (or specified) in more than three degrees of freedom, and the measurements (of the first and/or second part) may be obtained and may be of a type so as to enable this to be achieved.

Positioning the second part relative to the first part may comprise moving (or controlling the machine to move) the second part relative to the first part in more than three degrees of freedom, for example four degrees of freedom or five degrees of freedom or six degrees of freedom. Positioning the second part relative to the first part may comprise actuating a number of axes of the machine that correspond in number to the degrees of freedom. For example, positioning the second part relative to the first part may comprise actuating four axes of the machine (to move the second part relative to the first part in four degrees of freedom), or actuating five axes of the machine (to move the second part relative to the first part in five degrees of freedom), or actuating six axes of the machine (to move the second part relative to the first part in six degrees of freedom). Accordingly, positioning the second part relative to the first part may be referred to as four-axis positioning, five-axis positioning, or six-axis positioning, depending on the number of degrees of freedom involved. Positioning may even be in more than six degrees of freedom, for example by supporting one or both of the first and second parts on a rotary table or via an articulating head such as the Renishaw REVO® probe head.

The measurements (of the first and/or second part) may be three-dimensional measurements, i.e. measurements in three dimensions.

The measurements (of the first and/or second part) may be in three or more degrees of freedom.

The measurements may be obtained by moving (or controlling the machine to move) in three or more degrees of freedom, preferably in four degrees of freedom, more preferably in five degrees of freedom and more preferably in six degrees of freedom.

The measurements may be obtained by moving (or controlling the machine to move) a measuring device in three or more degrees of freedom, preferably in four degrees of freedom, more preferably in five degrees of freedom and more preferably in six degrees of freedom. The measuring (or measurement) device may be of a type set out below (e.g. a probe, contact probe, touch probe, touch trigger probe, analogue probe, scanning probe, or a camera-based measurement device).

Obtaining the measurements (of the first and/or second part) may comprise actuating three or more axes (or degrees of freedom) of the machine, for example four axes or five axes or six axes. For example, where the machine is a hexapod coordinate measuring machine comprising six extendible legs (corresponding to six axes), the measurements may be obtained by actuating all six extendible legs (all six axes).

The measurements (of the first and/or second part) may be coordinate measurements.

The measurements (of the first and/or second part) may be point coordinate measurements.

The measurements (of the first and/or second part) may be (or may include) machine coordinates (or coordinates derived therefrom). Machine coordinates may be defined within the machine coordinate system (as opposed e.g. to the part coordinate system or the global coordinate system).

Positioning the second part relative to the first part may comprise controlling the machine to adopt a series of different machine coordinates (within the machine coordinate system).

The measurements (of the first and/or second part) and the positioning of the second part may be based on (or performed within) the same machine coordinate system.

The coordinate measuring machine may comprise a plurality (or set) of measurement transducers (e.g. linear and/or rotary encoders; or length- and/or angle-measuring transducers), with the same plurality (or set) of measurement transducers being used for obtaining (or to derive) the measurements (of the first and/or second part) and for positioning of the second part based on those measurements.

The measurements may be based on or derived from the entire metrology loop of the coordinate measuring machine. This is to be distinguished from a system in which measurements are taken e.g. by a camera- or laser-based vision system affixed to the end effector of a positioning machine such as a robot, with the robot being used merely to place the vision system within range of the target, and to guide the end effector (and any component held by the end effector) towards the target based on real-time feedback from the vision system, without also taking into account measurements from the rotary encoders of the rotary joints making up the articulated robot arm. With an embodiment of the present invention it becomes possible to determine a full set of machine coordinates that, when enacted by the machine, will cause the second part to be placed in the predetermined spatial relationship relative to the first part.

Positioning the second part in the predetermined spatial relationship relative to the first part may comprise calculating a set of machine coordinates, in dependence upon the measurements (of the first and/or second part), which will position the first and second parts into the predetermined spatial relationship, and controlling the machine to adopt the calculated machine coordinates. The machine may be controlled to adopt the calculated machine coordinates directly or substantially directly, i.e. with substantially a single move. This is to be compared with an iterative or incremental series of smaller moves that might be performed based e.g. on visual feedback from a separate camera or imaging system.

The method may comprise controlling the machine to hold the first and second parts in the predetermined spatial relationship while performing an operation to fix the first and second parts in the predetermined spatial relationship. This may enable the second part to be released from the second platform with the first and second parts remaining in the predetermined spatial relationship without support from the second platform.

Controlling the machine to hold the first and second parts in the predetermined spatial relationship may comprise controlling the machine to maintain the calculated machine coordinates.

The fixing operation may comprise applying a fixing medium that is in contact with the second part when in the predetermined spatial relationship with the first part, and activating the fixing medium to fix the first and second parts in the predetermined spatial relationship.

The method may comprise applying the fixing medium before moving the first and second parts into the predetermined spatial relationship, and then activating the fixing medium when the first and second parts are in the predetermined spatial relationship.

The fixing medium may be a curable adhesive, wherein activating the fixing medium may comprise curing the adhesive.

The fixing operation may comprise a welding process, with the fixing medium and activation thereof being a result of performance of the welding process. For example, the fixing material may be a weld (e.g. melted) material resulting from the welding process, with activation of the fixing material being the hardening or cooling of the weld material.

The welding process may be a laser welding process, but may also be a bonding process, a friction welding process, an e-beam welding process, a hot air bonding process, or an electrochemical process.

Advantageously, the second part is not in direct contact with (e.g. does not touch) any other part of the article when the first and second parts are in the predetermined spatial relationship, at least not in a manner which would interfere with or influence or affect the predetermined spatial relationship.

The method may comprise leaving a gap between the second part and any other part of the article when in the predetermined spatial relationship.

The gap may be at least partly bridged by the fixing medium applied in the fixing operation.

The gap is preferably at least 25 μm, more preferably at least 50 μm, more preferably at least 100 μm, for example determined as an average across a region of overlap between the parts concerned.

The method may comprise using the established relationship to determine where to apply the fixing medium.

The machine may comprise first and second platforms moveable relative to one another, and the method may comprise supporting the first part on the second platform and supporting the second part on the first platform. Positioning the second part relative to the first part may comprise controlling the machine to move the first and second platforms relative to one another.

Supporting the second part on the first platform may comprise picking up the second part using a pick-up device supported on the first platform.

The pick-up device may comprise a gripper.

The second part may be coupled kinematically (or at least pseudo-kinematically) to the pick-up device when being supported by the first platform. The pick-up device may be provided with a set of kinematic (or at least pseudo-kinematic) features which engage with the second part when being supported by the first platform. The second part may be provided with a corresponding set of kinematic (or at least pseudo-kinematic) features which engage with the kinematic (or at least pseudo-kinematic) features of the pick-up device. Where relative constraint between the pick-up device and the second part is required in fewer than six degrees of freedom, then the surface of the second part which engages with the kinematic (or at least pseudo-kinematic) features of the pick-up device may be designed accordingly in order to achieve the required degree of constraint. For example, in the case where the second part is a ball, and where constraint relative to the pick-up device is only required in three translational degrees of freedom (with rotation in three degrees of freedom around the centre of the ball being allowed), then sufficient kinematic coupling is achieved by having kinematic features on the pick-up device (e.g. three point-like contacts arranged on a spherical surface corresponding to that of the ball).

The method may comprise using a model of the second part, and knowledge of the position of the second part relative to the first platform by virtue of the kinematic coupling, to obtain the measurements of the second part, rather than using the coordinate measuring machine to obtain the measurements of the second part.

The first platform may be a moveable platform and the second platform may be a fixed platform.

The method may comprise measuring the first part using a first probe supported on the first platform.

Measuring the first part with the first probe may comprise moving the first and second platforms relative to one another to bring the first probe into a sensing relationship with the first part.

The first probe may be a moveable probe.

The first probe may be a contact probe. The first probe may be a touch probe. The first probe may be a touch trigger probe. The first probe may be an analogue probe. The first probe may be a scanning probe.

The method may comprise measuring the second part using a second probe supported on the second platform.

Measuring the second part with the second probe may comprise moving the first and second platforms relative to one another to bring the second probe into a sensing relationship with the second part.

The second probe may be a fixed probe.

The second probe may be a contact probe. The second probe may be a touch probe. The second probe may be a touch trigger probe. The second probe may be an analogue probe. The second probe may be a scanning probe.

The method may comprise measuring the first probe with the second probe and/or vice versa to establish the relationship between the first and second frames of reference.

Measuring the first probe with the second probe and/or vice versa may comprise moving the first and second platforms relative to one another to bring the first and second probes into a sensing relationship with one another.

The first and second probes may each comprise a (stylus having a) stylus tip. The common or coincident point may be the centre point of the stylus tip of the first and second probes when the first and second platforms are in a position relative to one another which would place the (respective centres of the) stylus tips of the first and second probes in the same position.

When one of the first and second probes is a touch trigger probe and the other of the first and second probes is a scanning or analogue probe, the method may comprise using an extrapolate to zero technique to measure or characterise the surface of the stylus tip of the touch trigger probe and determining the centre point of the stylus tip from that.

The second part may be supported on a rotatable stage. The rotatable stage may be supported on the first platform. Positioning the first part relative to the second part may comprise controlling the machine to rotate the rotatable stage relative to the first platform.

The article (and with it the first part) may be supported on a rotatable stage. The rotatable stage may be supported on the second platform. Positioning the first part relative to the second part second comprise controlling the machine to rotate the stage relative to the second platform.

The first and second platforms may be moved relative to one another in more than three degrees of freedom to position the second part relative to the first part.

The first part may be a support or substrate part of the article.

The first and second parts may be operative parts of the article having a function in use of the article, and not merely reference features, fiducials or the like which only have a function during manufacture of the article.

The parts may be functionally and/or mechanically and/or optically inter-related parts of the final article.

The second part may be supported in the resulting article on the first part. If several parts are supported in this way, a stacked or series arrangement is produced. The fixing medium used in the fixing operation may be provided between the first and second parts. The fixing medium used in the fixing operation may be provided in contact with the first and second parts.

The first and second parts may be supported in the resulting article on a base part of the article. It may be that the first and second parts are not directly supported one on the another. If several parts are supported in this way, a side-by-side or parallel arrangement is produced. The fixing medium used in the fixing operation may be provided between the second part and the base part. The fixing medium used in the fixing operation may be provided in contact with the second part and the base part.

A combination of a parallel and series arrangement of parts is also possible.

The first part may be or may comprise a base part or substrate of the article.

The method may comprise using a measuring device other than a probe to obtain the measurements. A measuring device such as a camera may be used. Such a camera-based measuring device may comprise at least two, preferably three, imaging sensors arranged at different respective angles or orientations relative to the target (i.e. the part being measured). A non-contact measurement device may be used. An optical measurement device may be used.

Obtaining measurements of the part may comprise obtaining measurements of one or more features of the part.

Obtaining measurements of the part may comprise obtaining measurements of one or more discrete points on a surface of the part.

The coordinate measuring machine may be a machine that is adapted to measure the geometry or geometrical characteristics of a physical object in three dimensions by sensing discrete points on the surface of the object with a probe.

The coordinate measuring machine may be a machine having a coordinate measuring device such as a probe for measuring coordinates of points on the surface of an object.

The coordinate measuring machine may be a non-Cartesian coordinate measuring machine.

The coordinate measuring machine may be a parallel kinematic coordinate measuring machine. Such a measuring machine may have a plurality of metrology and/or drive axes arranged in parallel rather than in series, so that positioning errors associated with the respective axes are not cumulative as they are with a serial kinematic coordinate measuring machine; this typically results in improved measurement accuracy and better metrology results.

The coordinate measuring machine may comprise a plurality of extendable legs.

The coordinate measuring machine may be a hexapod coordinate measuring machine, comprising six extendable legs. Or the machine may be a pentapod, comprising five extendable legs. Or the machine may be a quadrapod, comprising four extendable legs.

The coordinate measuring machine may be in the form of an articulated arm having a plurality of rotary joints arranged in series. This may be considered to be similar to a machine commonly referred to as a robot arm.

The coordinate measuring machine may have a measurement accuracy (or error) of less than 50 µm, more preferably less than 25 µm, more preferably less than 10 µm, more preferably less than 5 µm, and more preferably less than 1 µm.

The machine coordinates of the coordinate measuring machine may comprise values relating respectively to and/or derived from the lengths of the plurality of extendable legs.

The plurality of measurement transducers may be associated respectively with the plurality of extendable legs.

The second part and a measuring device (e.g. probe) for obtaining the measurements of the first part may be supported simultaneously on a common platform of the machine which is moved when measuring the first part and when positioning the second part.

The method may comprise repeating the method for one or more additional second parts of the article. The first part in each repeat performance of the method may be any part or parts of the article resulting from any previous performance of the method.

The first part in at least one of the repeat performances of the method may comprise at least one second part from any previous performance of the method.

In a subsequent performance of the method, a second part from a previous performance of the method (which is now considered to be a first part because it has already been placed on the article, with a new second part being placed) can be one of the parts measured by the coordinate measuring machine and used to position the new second part. It is also possible that the second part from a previous performance of the method (which is now a first part because it has already been placed on the article) is not measured in a subsequent performance of the method, relying instead on (fresh or pre-existing) measurements of other parts of the article when positioning the new second part.

Using the machine to obtain measurements of the first part in at least one of the repeat performances of the method may amount to using measurements of that first part obtained in a previous performance of the method. In other words, if the first part has already been measured in a previous performance of the method it does not need to be measured again, it merely being required to (use the coordinate measuring machine, e.g. a machine controller thereof to) retrieve the measurements already obtained for the first part.

The or each second part may be or may form part of a bearing assembly for an extendible leg of a coordinate positioning machine, or may be a ball or tip of a stylus for a measurement probe.

The first part may be or may form part of a readhead or a readhead holder for an extendible leg of a coordinate positioning machine, or may be a stem of a stylus for a measurement probe.

Accordingly, the present invention is applicable to a method of manufacturing an extendible leg for a coordinate positioning machine and/or a stylus for a measurement probe.

According to a second aspect of the present invention, there is provided a method of manufacturing an article having a plurality of parts, comprising: for a first selected part of the plurality, performing at least the measurement and positioning steps of a method according to the first aspect of the present invention to position the first selected part on the article; and for each subsequent selected part of the plurality, performing at least the positioning step and optionally also the measurement step of a method according to the first aspect of the present invention to position the subsequent selected part on the article, with the positioning step using measurements obtained when performing the method for the current and/or for any previous selected part.

At least one of the plurality of parts may be a module made during the course of performing the method from a plurality of other parts of the plurality.

According to a third aspect of the present invention, there is provided a manufacturing system or apparatus comprising a coordinate measuring machine configured to perform a method according to the first or second aspect of the present invention.

According to a fourth aspect of the present invention, there is provided a computer program which, when run by a controller for a coordinate measuring machine, causes the controller to operate the coordinate measuring machine to perform a method according to the first or second aspect of the present invention.

According to a fifth aspect of the present invention, there is provided a computer-readable medium having stored therein computer program instructions for controlling a coordinate measuring machine to perform a method according to the first or second aspect of the present invention.

The "position" of a part is to be understood as being the position and/or orientation of the part, to the appropriate number of degrees of freedom. In particular, the terms "position" and "positioning" are not to be understood as being limited to describing only translational movements (e.g. movements in X, Y, Z) but is intended to describe both translational movements and rotational movements or a combination thereof, to the relevant number of degrees of freedom. For example, where the position is defined in six degrees of freedom then both the position and orientation are relevant. However, if the position is only defined in three degrees of freedom then this may or may not include the orientation. The terms "position" and "positioning" used herein are to be interpreted accordingly.

Reference will now be made, by way of example, to the accompanying drawings, in which.

Figure 33:
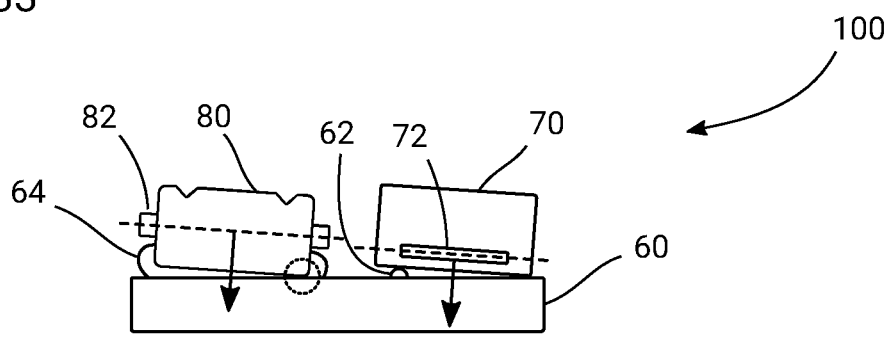
Figure 32:
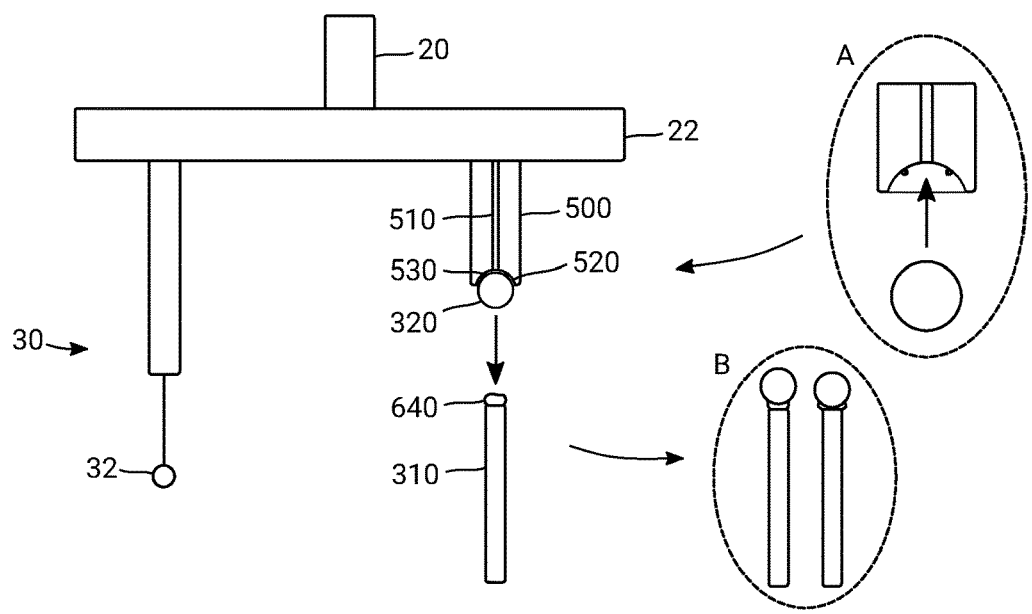
Figure 24:
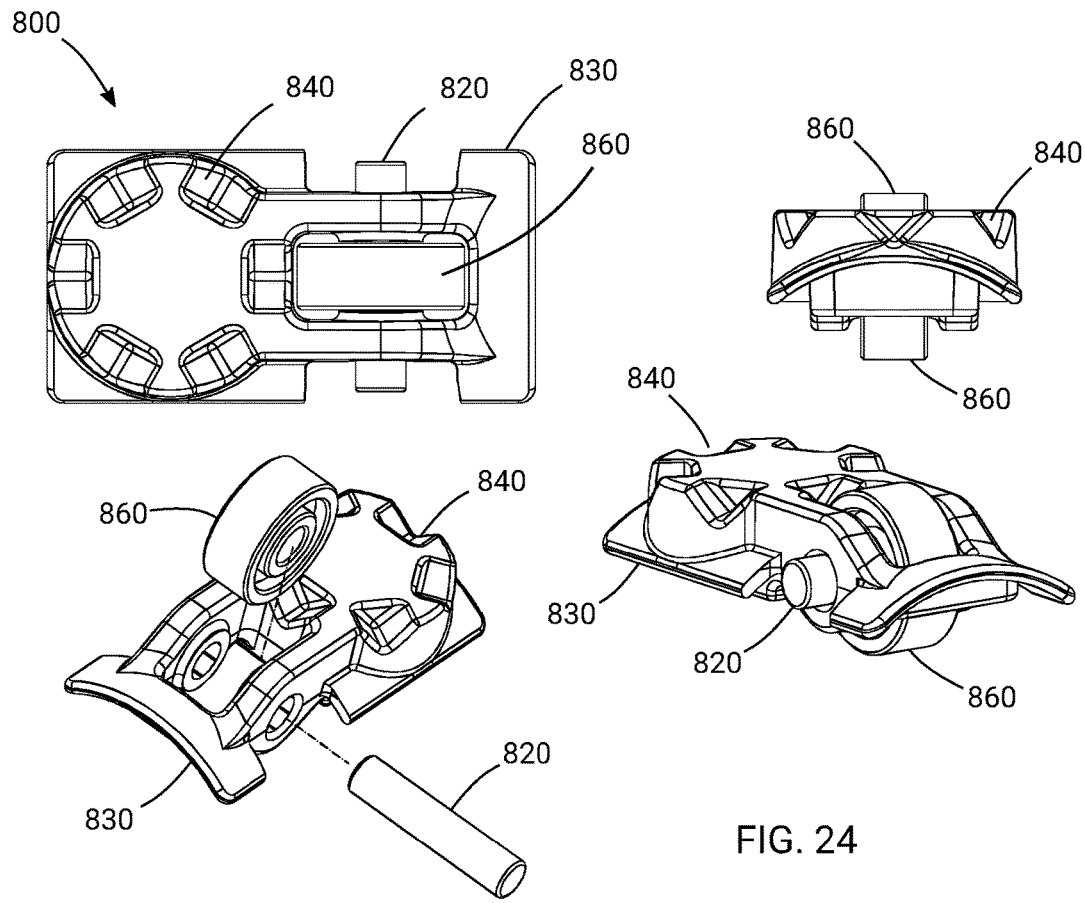
Figure 26:
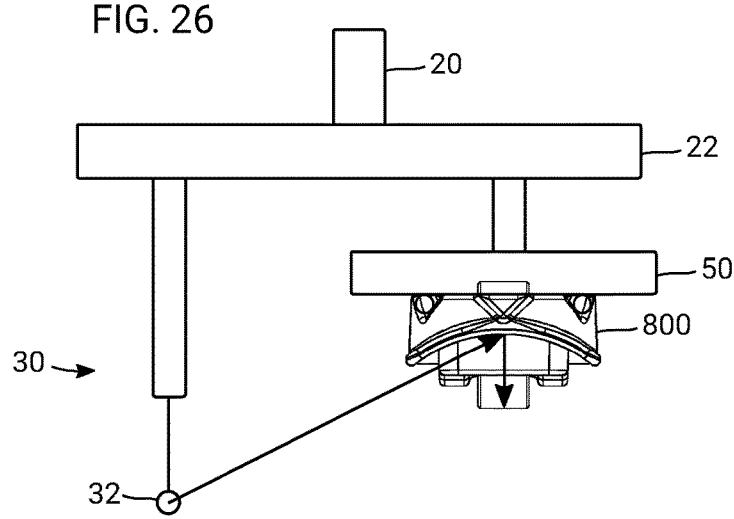
Figure 34:
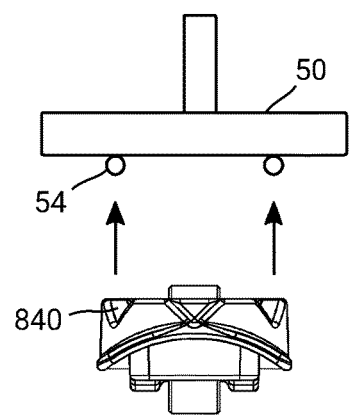
Figure 25:
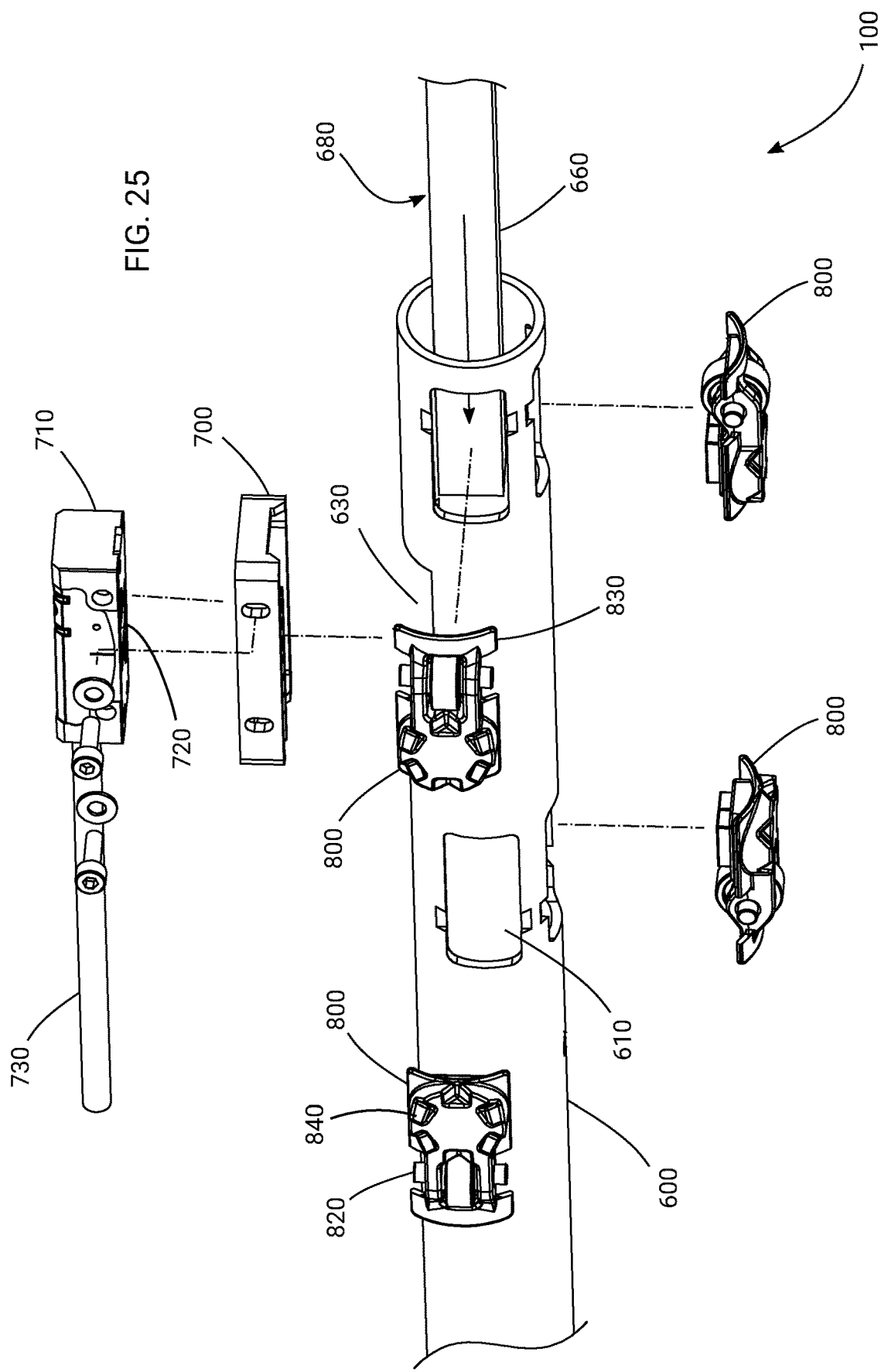

FIGS. 24 and 25 provide a more realistic and practical implementation of an article manufactured by a method embodying the present invention;

FIG. 26 shows the determination of an offset between a probe coincident point and a specific point on a part of the article supported on the moving platform, for use in changing a centre of rotation of the moving platform;

FIG. 27 illustrates the manufacturing method having been repeated to place additional second parts of the article side by side on the base part;

FIG. 28 illustrates an alternative to FIG. 27 in which the first part comprises only the base part of previous embodiments;

FIGS. 29 and 30 illustrate an alternative stacked arrangement to the side-by-side arrangement of FIGS. 27 and 28 respectively;

FIG. 31 illustrates using the concept to assemble one or modules and then applying the same concept to assembling the one or more modules into a greater whole (or complex product);

FIG. 32 illustrates the application of a method embodying the present invention to the manufacture of a metrology stylus;

FIG. 33 shows an alternative placement of the second part onto the base part, with at least one point of the second part touching the base part; and FIG. 34 shows in more detail how the v-grooves of the bearing assembly engage kinematically with the balls of the gripper.

Figure 1A:
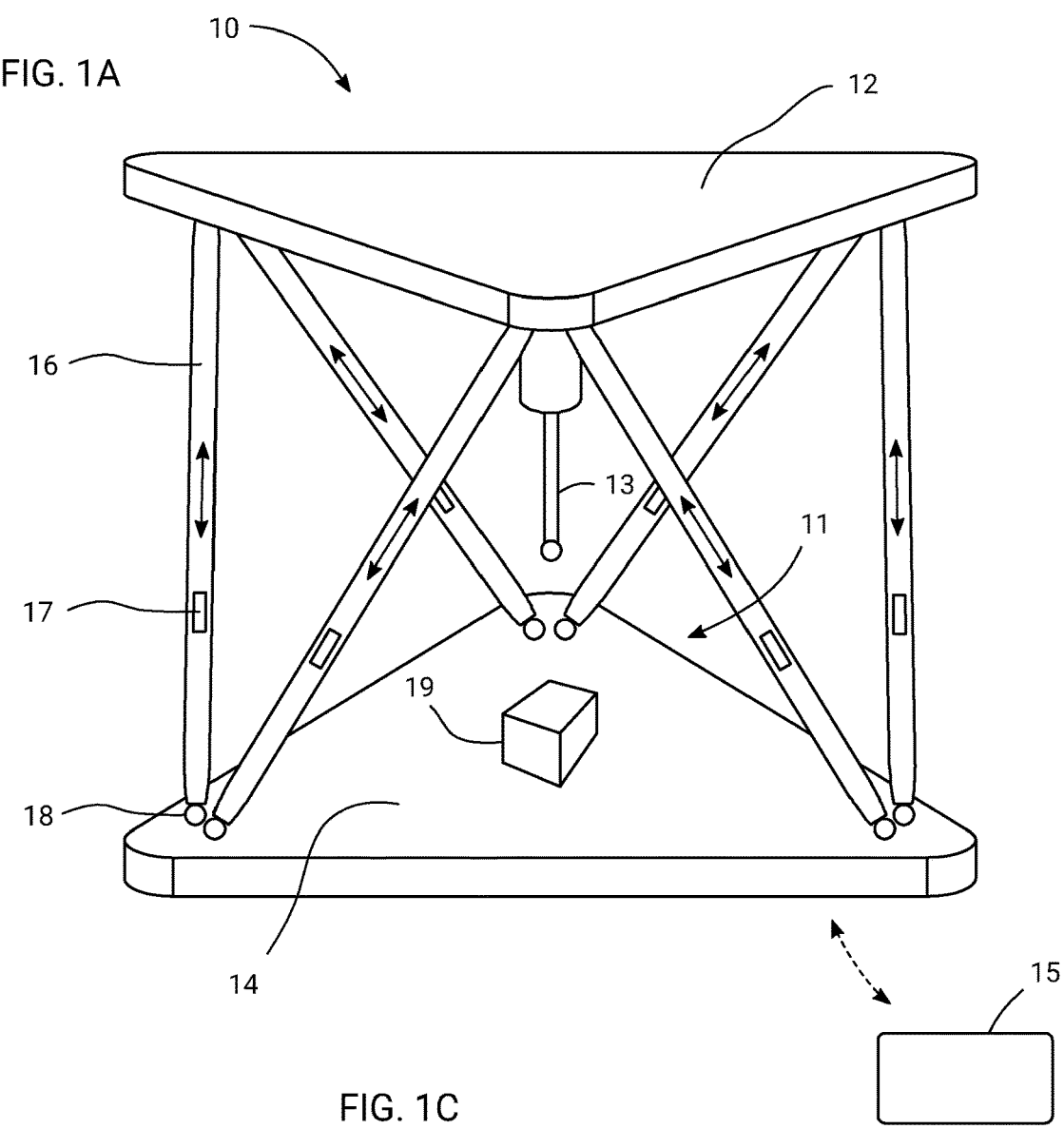
FIG. 1A is schematic illustration of a hexapod coordinate measuring machine, having six extendable legs.

A non-Cartesian coordinate measuring machine 10 is illustrated schematically in FIG. 1A. The coordinate measuring machine 10 generally comprises a moveable platform 12 and a fixed platform 14 that are supported and moved relative to each other by a plurality of telescopic or extendable legs 16 provided between them. The moveable and fixed platforms 12, 14 can also be referred to as stages (or structures or parts), and the extendable legs 16 can also be referred to as struts (or actuators). Where there are six such extendable legs 16 (as illustrated in FIG. 1A), the machine is commonly called a hexapod.

The extendable legs 16 are typically mounted on the platforms 12, 14 via ball joints 18, with each leg 16 either having its own ball joint 18 at one or both ends thereof (as illustrated in FIG. 1A) or sharing a ball joint 18 with an adjacent leg 16 at one or both ends. Each extendible leg 16 is typically formed as a pair of tubes, with one tube being moved telescopically within the other by a drive mechanism (e.g. linear motor) to provide extension and retraction of the extendible leg 16, as indicated by the arrows within each extendible leg 16 and as described in more detail for example in WO 2017/174966. A degree of separation between the drive and metrology parts of each strut can also be provided, as described in WO 2007/144573.

Various relative positions between the moveable platform 12 and the fixed platform 14 can be achieved by extending the legs 16 by differing amounts. The relative position at any instant is monitored by a plurality of length-measuring transducers 17, with one such transducer for each extendable leg 16. Each length-measuring transducer 17 may comprise an encoder scale paired with a readhead, with the encoder scale being mounted suitably to one of the pair of telescopic tubes and the readhead mounted suitably on the other. Extension of the leg 16 thus causes the encoder scale to move past the readhead thereby allowing the length of the extendible leg 16 to be measured. A computer controller 15 operates to set the length of each extendible leg 16 to provide the required relative movement between the platforms 12, 14. By having six such length-measuring transducers 17, the relative position can be measured in six corresponding respective degrees of freedom (three translational degrees of freedom and three rotational degrees of freedom).

Figure 1C:
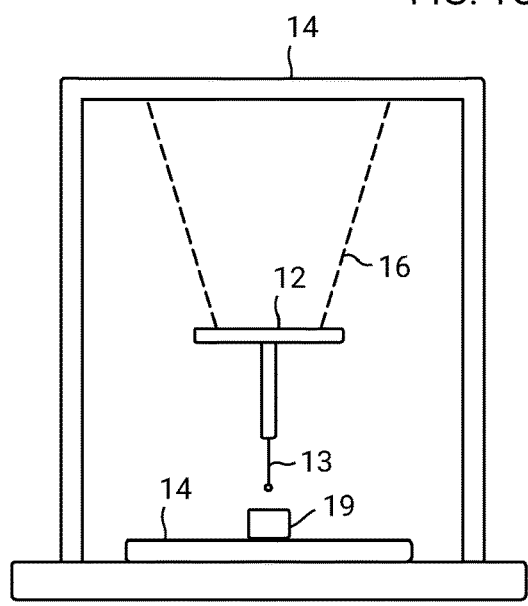
FIG. 1C is a schematic illustration of a top-down arrangement, which is an alternative to the bottom-up arrangement of FIG. 1B.
Figure 1B:
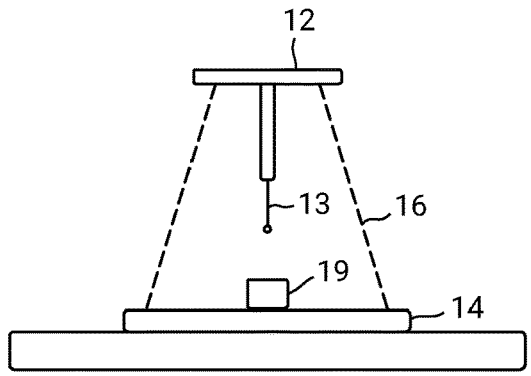
FIG. 1B is a schematic illustration of a bottom-up arrangement, such as shown in FIG. 1A.

A workpiece 19 is mounted on the lower (fixed) platform 14 and a measurement probe 13 is mounted on the upper (moveable) platform 12. A working volume (or operating volume) 11 is defined between the upper (moveable) platform 12 and the lower (fixed) platform 14, with the measurement probe 13 being positioned (i.e. moved to a desired position) in the working volume 11 by operation of the extendible legs 16. The arrangement of FIG. 1A can be referred to as a bottom-up arrangement because the extendible legs 16 extend up from the fixed platform 14 to the moveable platform 12. This arrangement is illustrated schematically in FIG. 1B. Alternatively, as illustrated schematically in FIG. 1C, with a top-down arrangement the extendible legs 16 extend down from the fixed platform 14 to the moveable platform 12, with the measurement probe 13 mounted to a lower surface of the moveable platform 12 and a workpiece mounted to another part of the fixed platform (or structure) 14 below that. These types of arrangement are discussed in more detail in WO 2019/073246, which also describes the use of a non-hexapod drive arrangement in combination with a hexapod metrology arrangement.

A manufacturing method according to an embodiment of the present invention will now be described with reference to FIGS. 2 to 12. The method can be described as a metrology-assisted manufacturing or assembly method, making use of a coordinate position machine 10 of a type as described with reference to FIG. 1A. FIGS. 2 to 12 show the machine 10 at different stages of the method, as will become apparent below.

The machine 10 of this embodiment comprises a set of extendible legs 16, a first platform 12 and a second platform 14, with the first platform 12 being moveable relative to the second platform 14 by operation of the extendible legs 16, just as is described above with reference to FIG. 1A. Accordingly, in this embodiment, the first platform 12 is a moveable platform and the second platform 14 is a fixed platform. The machine 10 of this embodiment differs from that shown in FIG. 1A mainly in what is attached to the moveable platform 12 and what is placed on the fixed platform 14, and of course in how the machine is operated.

A tool support 22 is attached to the first (moveable) platform 12 via a quill 20, with a first (moveable) measurement probe 30, a gripper 50 and a glue applicator 90 being attached to the tool support 22. On the second (fixed) platform 14 there is provided a second (fixed) measurement probe 40, as well as various parts 60, 70 and 80 of an article being manufactured (or assembled) in the method. Due to the limitations of representing a three-dimensional machine schematically in only two dimensions, the glue applicator 90 is shown only in FIG. 8 (which is the stage of the method at which it comes into operation), but all three tools 40, 50 and 90 are supported simultaneously on the tool support 22 (and therefore also supported on the moveable platform 12 via the quill 20). The quill 20 is of a suitable length to place the tool support 22 (and in particular the tools 40, 50 and 90) in a suitable position in the working volume 11 of the machine.

With the above arrangement it can be seen in particular that there are two probes: a first (moveable) probe 30 is provided on the first (moveable) platform 12 and a second (fixed) probe 40 is provided on the second (fixed) platform 14. The reason for this arrangement will become apparent below. The first probe 30 has a stylus tip (or probe tip) 32, and the second probe 40 has a stylus tip (or probe tip) 42.

Figure 2:
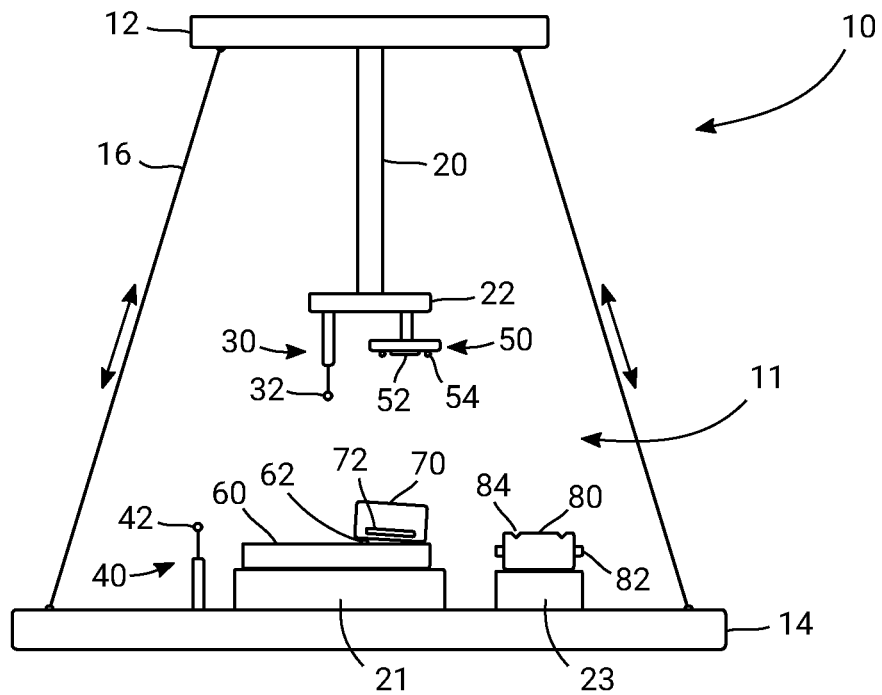
FIGS. 2 to 12 are schematic diagrams showing various stages of a manufacturing method embodying the present invention.

As shown also in FIG. 2, the article being assembled has a base part 60, a first part 70 which has already been fixed to the base part 60, and a second part 80 which is to be placed (as part of the method) onto the base part 60 in a predetermined spatial relationship with the first part 70. The first part 70 has a representative feature 72 and the second part 80 has a representative feature 82, and it is important in particular that, in the final article, these representative features 72, 82 are precisely positioned relative to one another. The base part 60 (and with it the first part 70) is supported on the fixed platform 14 via a first support 21, while the second part 80 is supported on the fixed platform 14 via a second support 23; these fixed supports 21, 23 are to raise the supported parts to a more convenient height for measuring and/or manipulation, but can also provide a fixturing function to hold the supported parts in place.

Referring now briefly to other known manufacturing techniques to put an embodiment of the present invention into context, when assembling components onto a printed circuit board it is typically not critical that a component is very precisely positioned on the circuit board, either absolutely or relative to other components. Rather, a reasonable degree of manufacturing tolerance is allowed, because it is merely required that the contacts of the component are positioned over the correct corresponding solder pad on the circuit board so that it will be in electrical contact with that solder pad, via the solder. In this respect, the manufacture of the majority of printed circuit board assemblies (PCBAs) is performed using a surface mounting technique that includes a reflow soldering stage. In such a technique, the solder pads of the board are plated with a solder paste before component placement. An automated "pick and place" machine is then used to place the components, in turn, on the appropriate pads of the board, releasing each component so that it is held only very loosely by the uncured solder paste, i.e. the components are not fixed or held securely in place before being released by the pick and place machine. The board is then placed in a reflow soldering oven that typically comprises multiple stages for gradually heating (e.g. using a heated gas or infrared radiation) the whole board until a temperature is reached at which the solder paste melts or reflows. The board is then slowly cooled whereupon the molten solder solidifies and fixes the components securely in place.

With the manufacture of PCBAs as described above, because of the relatively large size of the solder pads, the placement of components on the circuit board does not need to be highly accurate. With the image-based system method of U.S. Pat. No. 6,266,869 (described further above), in which the components being assembled together are imaged by an imaging (e.g. video) system to establish their position relative to each, the method is computationally intensive (and therefore relatively slow) as well as being relatively inaccurate due to the image-based methods. Furthermore, the components may shift slightly after being released by the machine, and before being processed in the reflow soldering oven, but this is inconsequential in the context of PCBA manufacture because accurate spatial positioning not required, only reliable electrical connection.

With an embodiment of the present invention it is assumed that a higher positional accuracy is required than is possible with these known methods, and in particular that the first and second parts 70, 80 must be accurately fixed relative to one another in a predetermined spatial relationship.

With this in mind, it can be seen in FIG. 2 that the first part 70 (and in particular the representative feature 72) is sitting at a slight angle with respect to the base part 60 because of a small imperfection (e.g. bump) 62 on the surface of the base part 60. It is important that the second part 80 (and in particular the representative feature 82) is accurately aligned with the first part 70 (and in particular the representative feature 72), regardless of any positional inaccuracies or imperfections associated with an already-placed part. For example, if a simple pick-and-place machine were being employed to place the second part 80 on the base part 60, like in the PCBA example mentioned above, then the presence of the imperfection 62 on the base part 60 would not be taken into account, so that the second part 80 (and in particular the representative feature 82) would not end up being accurately aligned with the first part 70 (and in particular the representative feature 72). It is also likely that the image-based methods would be unable to detect such small imperfections or misalignments and/or to do so at a sufficiently high refresh rate. For PCBA manufacture it is sufficient to assume that the substrate is perfectly planar, but an embodiment of the present invention is applicable to the accurate positioning of parts 70, 80 onto an imperfect and/or non-planar substrate or base part 60.

Figure 3:
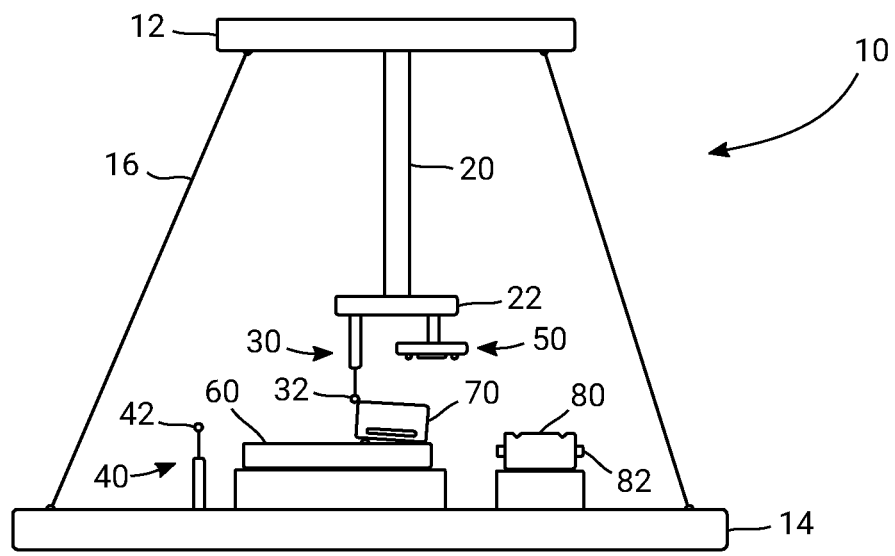

Referring now to FIG. 3, the first and second platforms 12, 14 are moved relative to one another to bring the first probe 30 into a sensing relationship with the first part 70. This relative movement of the first and second platforms 12, 14 is, as explained above, achieved by varying the lengths of the extendible legs 16, under control of the controller 15 (see FIG. 1A). This amounts to measuring the first part 70 with the first probe 30 at one or more points to provide a set of measurements. For example, if it is known that the first part 70 is generally cuboidal, a measurement can be taken on each side of the first part 70 to establish where the sides are and how the plane of each side is oriented. Further measurements can be taken if necessary, such as at one or more corners, in order to better characterise the first part 70, or it is also possible that fewer measurements are taken if it is only necessary e.g. to determine information about the plane of the top surface, for example. These measurements of the first part 70 are used to establish a frame of reference for the first part 70. The measurements of the first part 70 are three-dimensional point coordinate measurements. Collectively they can be considered to be measurements in more than three degrees of freedom because they define both the position (three translational degrees of freedom) and the orientation (at least one rotational degree of freedom, preferably three rotational degrees of freedom) of the first part 70.

Figure 4:
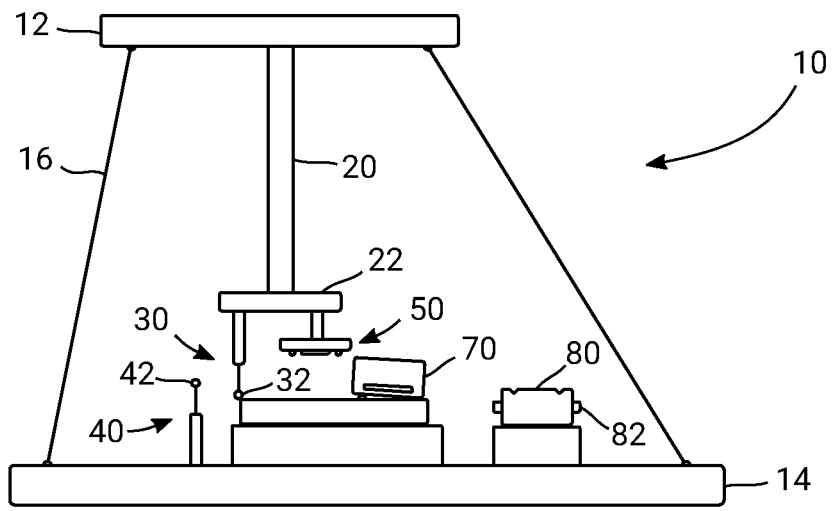

As shown in FIG. 4, in this embodiment the base part 60 is also measured with the first probe 30 in order to establish a frame of reference for the base part 60. This might be necessary if it is required to locate one or more features on the base part 60 which are used to determine exactly where on the base part 60 the second part 80 is to be placed. For example, there may be one or more locating features (e.g. markings or a recess) on the base part 60 over or into which the second part 80 is to be placed, so that positioning of the second part 80 relative to the first part 70 is determined partly by features on the first part 70 and partly by features on the base part 60.

It can conveniently be considered that the first part 70 comprises the base part 60, so that FIGS. 3 and 4 show a single step of measuring the first part 70 (including base part 60) with the first probe 30 in order to establish a frame of reference for the first part 70 (including base part 60). In other words, the first part 70 may itself have multiple parts, and any one or more of those multiple parts could be relevant in determining the frame of reference for the first part and how the second part 80 is positioned relative to the first part 70.

In this embodiment the first probe 30 is a contact or touch probe, as is the second probe 40. Touch probes are well known. In order to take a measurement with the first probe 30, for example, machine is controlled to bring the stylus tip 32 into contact with the object being measured. When a touch is sensed, the machine coordinates (e.g. the lengths of the extendable legs 16) are recorded, and from these machine coordinates the X, Y, Z coordinate of the touch point can be calculated. This assumes that the machine has been calibrated to provide some sort of mapping between the machine coordinates (such as the outputs from the length-measuring transducers 17 shown in FIG. 1A) and the coordinates of the stylus tip, or at least the coordinates of the support to which the stylus is attached. Machine calibration techniques typically have in common the goal of specifying a parametric model of the machine concerned, in which a plurality of parameters are used to characterise the machine's geometry. Uncalibrated values are initially assigned to these parameters as a starting point for the machine geometry. During the calibration, the machine is moved into a variety of different poses (based on the current estimates of the machine parameters). For each pose, a calibrated measuring device is used to measure the actual pose, so that an indication of the error between the assumed machine pose and the actual machine pose can be determined. The task of calibrating the machine then amounts to determining a set of values for the machine various parameters that minimises the errors, using known numerical optimisation or error minimisation techniques (such as the Levenberg-Marquardt algorithm).

Figure 5:
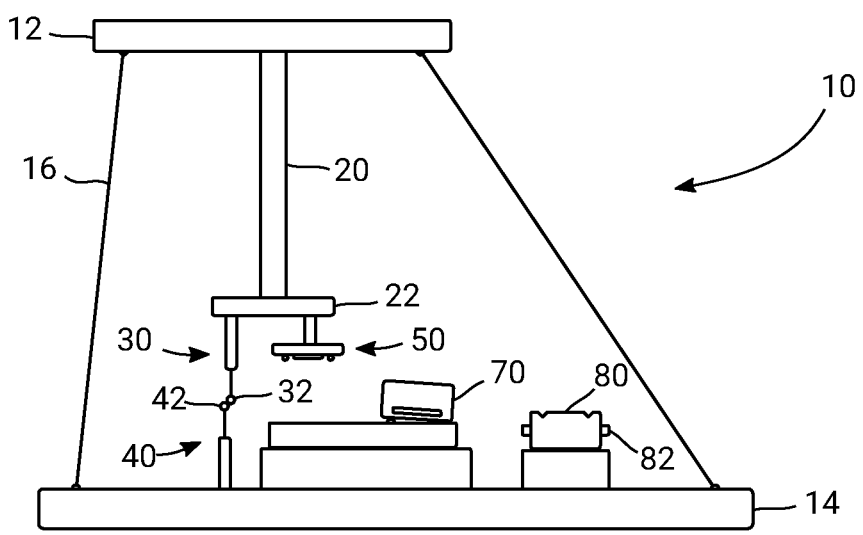

In the step shown in FIG. 5, the first probe 30 is then used to measure the second probe 40 (or vice versa) and these measurements are used to establish a relationship between the frames of reference determined above for the first part 70 and a frame of reference to be determined (see below) for the second part 80. This amounts to measuring the probe coincident position, which is the position of the machine (i.e. the relative positions of the first and second platforms 12, 14) which would place the stylus tip 32 of the first probe 30 at exactly the same position as the stylus tip 42 of the second probe 40. Since it is not possible in practice to do this, instead this is done by take touch measurements with the first stylus tip 32 around the second stylus tip 42 and a sphere is fitted to these measurements in order to determine where the coincident point is (i.e. the position of the centre of the second stylus tip 42). The two probes 30, 40 can be arranged to be of different stiffnesses, to ensure that either the second probe 40 triggers in preference to the first probe 30 when the two stylus tips 32, 42 are brought into contact with one another, or the first probe 30 triggers in preference to the second probe 40.

Coincident probe calibration using two touch trigger probes, as described above, can potentially suffer from different stiffnesses in X and Y versus Z of the probe stem and the kinematic springs. To overcome this, it is also possible to use an analogue or scanning probe to measure a touch trigger probe, instead of using two touch trigger probes. An analogue probe typically has a more uniform stiffness or response in X, Y and Z than a touch trigger probe. Furthermore, if an analogue probe is used to measure a touch trigger probe then an "extrapolate to zero" technique as described for example in WO 2005/059471 or WO 2004/005849 can be employed to provide a very accurate measurement of the tip surface of the other probe, from which a sphere fit can be performed as mentioned above to determine the probe coincident position. The extrapolation can be performed within the range of deflection experienced by the analogue probe before the touch trigger probe unseats and triggers. The analogue probe could be moved relative to the touch trigger probe, or vice versa.

Figure 6:
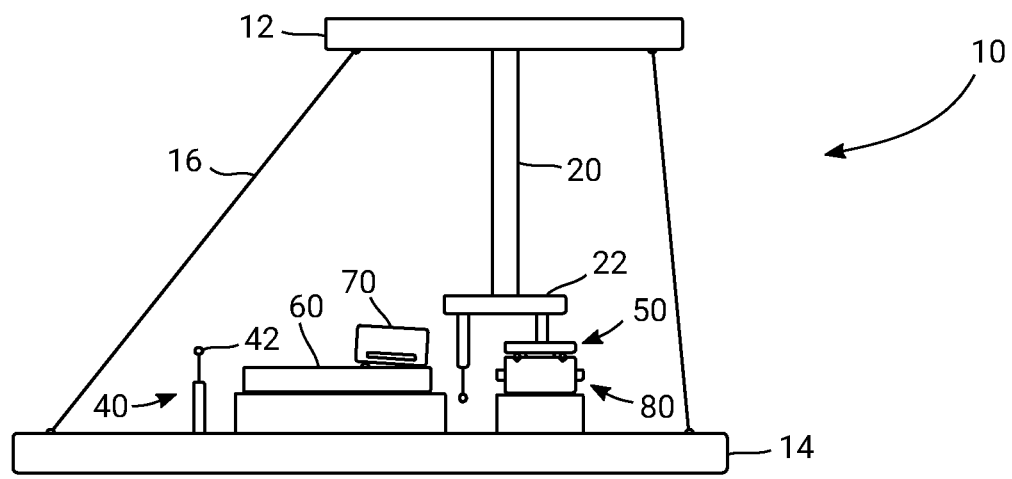

As described above, in this example the first part 70 of the article has already been provided on the second (fixed) platform 14, while the second part 80 is still waiting to be used on support 23. The next step is to support the second part 80 of the article on the first platform 12, so that it can be moved and put into position on the article. This is achieved in this embodiment by picking up the second part 80 from the support 23 using the gripper 50 that is supported on the first platform 12 via the support 22, as illustrated in FIG. 6. The machine is controlled (by appropriate changes to the lengths of the various extendible legs 16) to bring the gripper 50 into close proximity with the second part 80. The gripper 50 comprises a suction pad 52 which is activated when the gripper 50 is in close proximity with the second part 80, which holds the second part 80 against the gripper 50 with sufficient force that it can be lifted off the support 23 against the action of gravity.

On the surface of the gripper 50 that faces the second part 80, the gripper 50 is provided a set of three balls 54 which engage in a kinematic manner with a corresponding set of three v-grooves 84 on the surface of the second part 80 that faces the gripper 50. This ensures a predictable and consistent location of the second part 80 relative to the gripper 50, which aids subsequent measurement steps. It also ensures that, should the second part 80 slip slightly away from the gripper 50, e.g. by slight loss of suction in the suction pad 52 or because the second part 80 is knocked slightly, the second part 80 will couple again in precisely the same relative position when properly coupled again.

The concept of kinematic design involves constraining the degrees of freedom of motion of a body using the minimum number of constraints, and in particular involves avoiding over constraining. This ensures highly repeatable positioning of the body with respect to the holding device, and means that the body will sit on the holding device in a predictable, repeatable and known manner. This is described in H. J. J. Braddick, "Mechanical Design of Laboratory Apparatus", Chapman & Hall, London, 1960, pages 11 to 30, and in J. G. Skakoon, "Exact Constraint: knowing how much is enough—and how much too much—is a key to successful design", Mechanical Engineering, September 2009, pages 32 to 36. It will be appreciated that a theoretical kinematic coupling requires pure point contacts, which is not possible in practice. Rather, in practice the contact will be over a small area, which can be considered to be beneficial because it spreads the load, so the term kinematic coupling is to be understood as covering a pseudo- or quasi-kinematic coupling, with small contact areas rather than point contact areas. Kinematic design considerations can still be considered to be met even with small area contacts, with the actual contact area being dependent on the application concerned.

Figure 7:
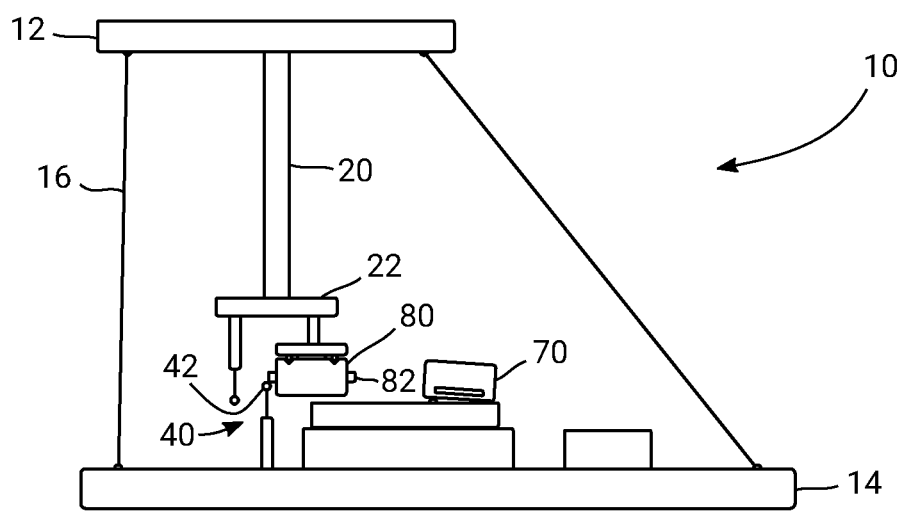

Having picked up the second part 80 so as to move with the first platform 12, as shown in FIG. 7 the second part 80 is then measured with the second probe 40 to establish a frame of reference for the second part 80. This is entirely equivalent to what is described above with reference to FIG. 3, though this time with the measurements being in relation to the second part 80 and with the measurements being provided by triggers from the second probe 40, which is supported on the second (fixed) platform 14. The measurements of the second part 80 are three-dimensional point coordinate measurements. Collectively they can be considered to be measurements in more than three degrees of freedom because they define both the position (three translational degrees of freedom) and the orientation (at least one rotational degree of freedom, preferably three rotational degrees of freedom) of the second part 80.

At present, the relationship between the first frame of reference (i.e. the frame of reference of the first part 70) and the second frame of reference (i.e. the frame of reference of the second part 80) has not been established, so the measurements of the first part 70 taken by the first probe 30 are basically independent of the measurements of the second part 70 taken by the second probe 40. In other words, a link has not yet been established between the respective measurements associated with the two different probes 30, 40. This is where the information obtained from the step shown in FIG. 5 comes into use, because the probe coincident position determined in that step can be used to establish a link or relationship between the first and second frames of reference, or to establish a common frame of reference. The relationship established between the two frames of reference is used in the subsequent steps, as shown in FIGS. 8 to 12, to move the first and second parts 70, 80 into a predetermined spatial relationship in a common frame of reference, and to fix the first and second parts 70, 80 relative to one another in the predetermined spatial relationship. This idea of establishing a relationship between the two frames of reference will be explained further below with reference to FIGS. 15 to 22.

Figure 8:
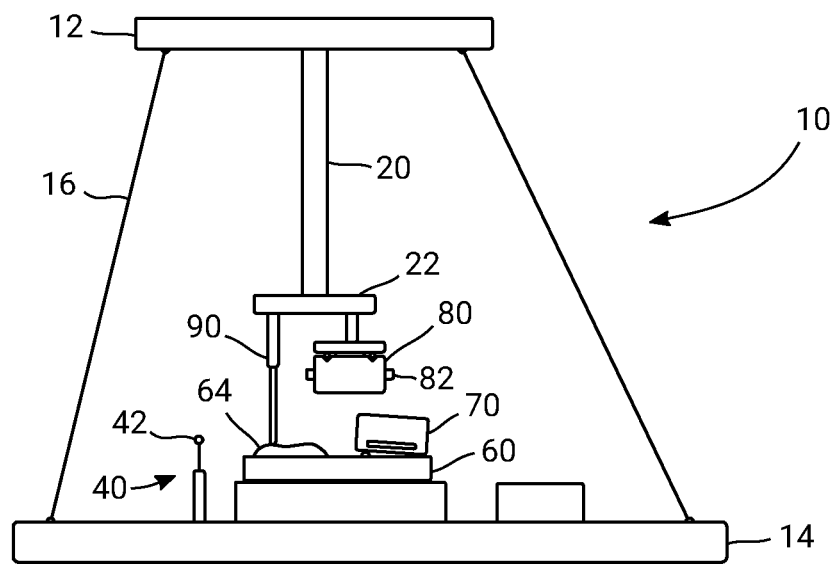
Figure 9:
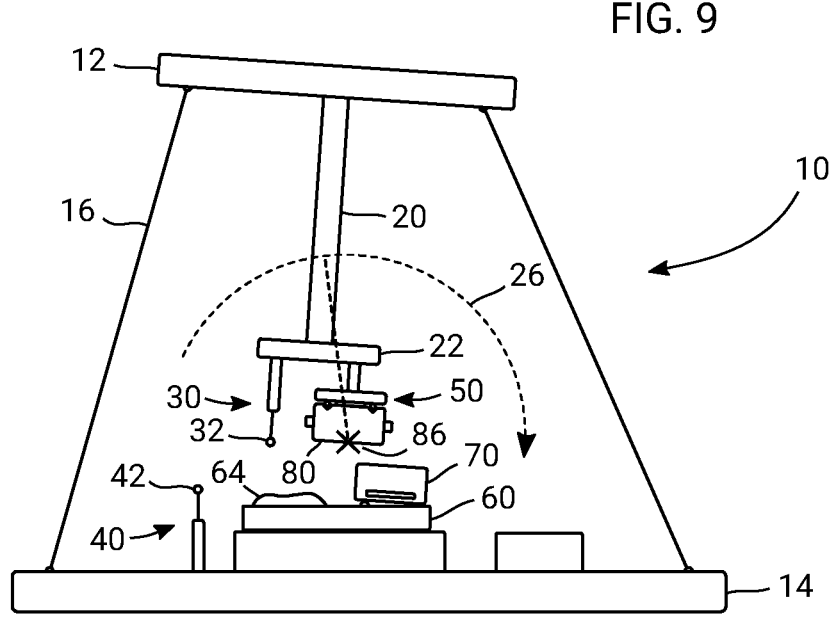

Having established a relationship between the two frames of reference, as illustrated in FIG. 8 some curable adhesive 64 is applied by the adhesive applicator 90 to the base part 60 where the second part 80 is to be placed. Then, as shown in FIG. 9, the machine is controlled (by appropriate changes to the lengths of the various extendible legs 16) to rotate the first (moveable) platform 12 relative to the second (fixed) platform 14 such that the second part 80 is properly aligned with the first part 70 in the common frame of reference. Conveniently, the relative rotation of the platforms 12, 14 is made so as to provide a fixed point of rotation that is coincident a point 86 located e.g. at the bottom of the second part 80, though this is not essential.

Figure 10:
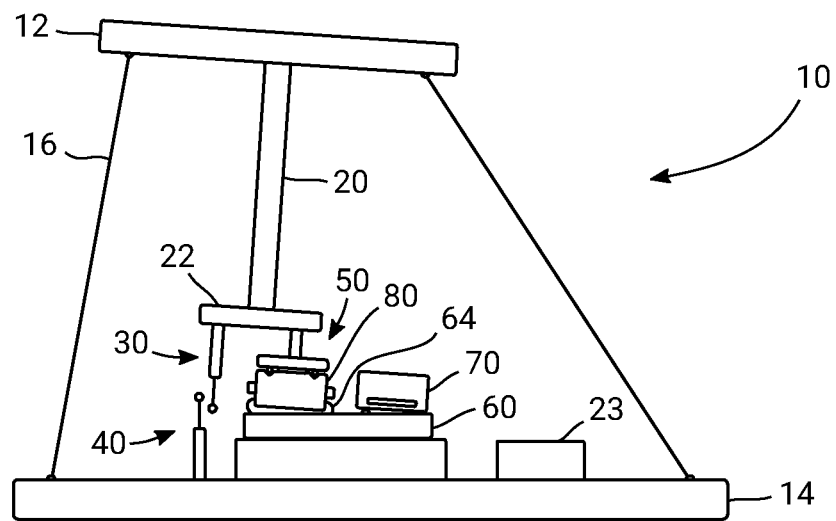
Figure 11:
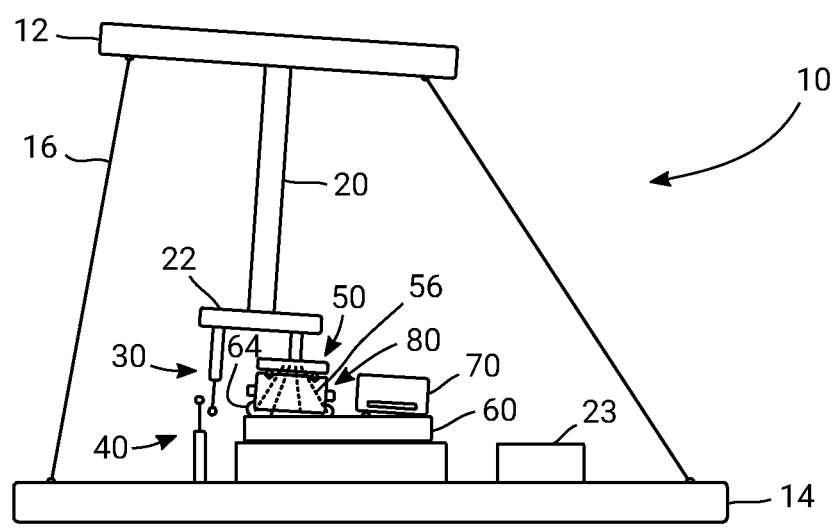

Then, having made use of the established relationship to achieve the correct alignment (orientation) of the second part 80 relative to the first part 70 in the common frame of reference, though not yet the correct position, as shown in FIG. 10 the machine is controlled (by appropriate changes to the lengths of the various extendible legs 16) to move the first (moveable) platform 12 relative to the second (fixed) platform 14 so as to position the second part 80 relative to the first part 70 in the correct spatial relationship (in both position and orientation) within the common frame of reference, with a gap deliberately being left between the first and second parts 70, 80. With the uncured adhesive 64 having been applied in the correct place, the second part 80 is still being held and supported by the machine relative to the first part 70, with uncured adhesive 64 filling the gap between them. As shown in FIG. 11, a UV source on the gripper 50 applies UV rays 56 to the adhesive 64 to cure it. The second part 80 may be at least partially transparent to UV rays (e.g. formed of a plastic material), or the UV rays could be applied around the second part 80; alternatively, a separate UV source could be provided on the support 22 or even elsewhere in the machine.

Figure 12:
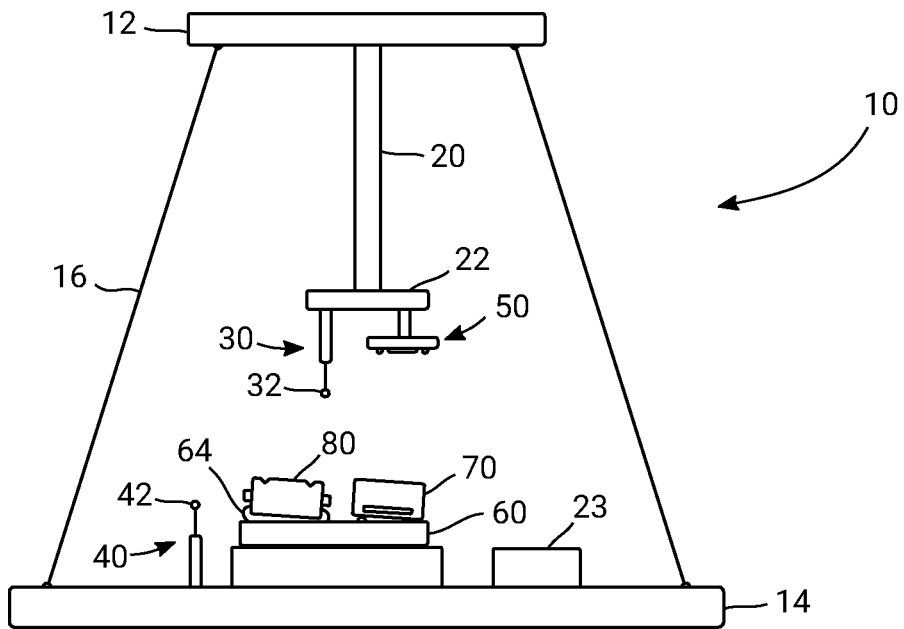

With the adhesive now cured, as shown in FIG. 12 the first platform 12 is moved away from the second platform 14, leaving the assembled article on the support 21, with first and second parts 70, 80 now fixed accurately in relation to one another on the base part 60. The final article 100 is shown in close-up in FIG. 13, which illustrates how the method described has resulted in the desired alignment between the representative features 72, 82 of the first and second parts 70, 80, despite the presence of the imperfection 62 on the surface of the base part 60.

Figure 14:
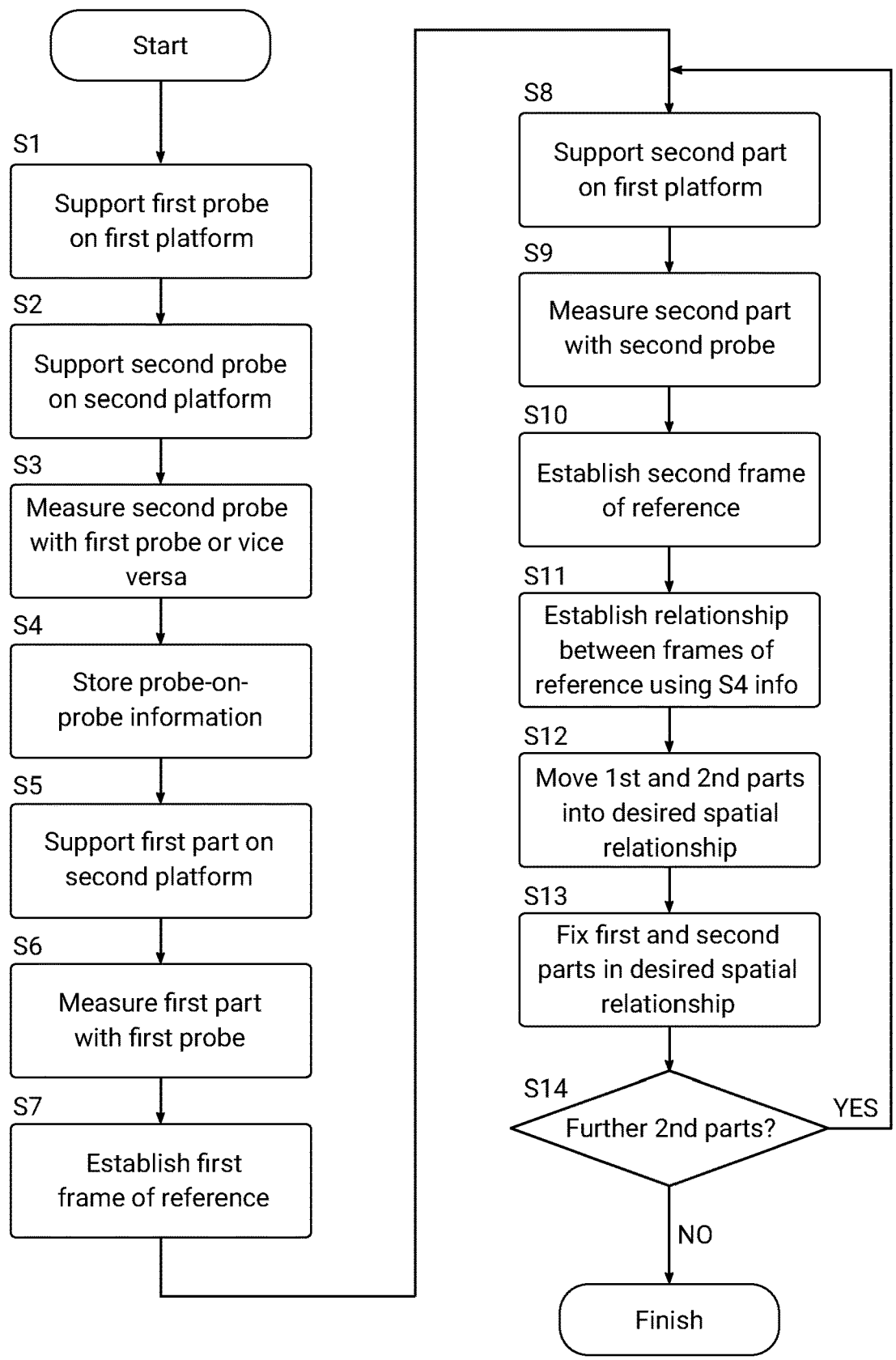
FIG. 14 is a flowchart summarising a manufacturing method according to an embodiment of the present invention.
Figure 15:
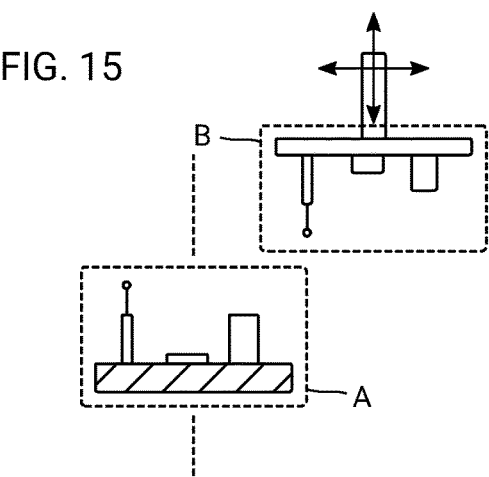
FIGS. 15 to 22 are schematic diagrams illustrating the concept of frames of reference in an embodiment of the present invention.

The method described above is summarised in the flowchart of FIG. 14.

The concept of using a fixed probe and a moving probe, and the idea of establishing a relationship between two frames of reference, as measured separately by the two probes, is summarised schematically in FIGS. 15 to 22. Similar to the representation used in FIGS. 2 to 12, FIG. 15 shows a moveable platform and a fixed platform that are moveable relative to one another. Of course, both platforms could be moveable, since it is relative movement between the two platforms that matters rather than the absolute positioning of one or the other; it is merely convenient in practice to have one fixed and the other moving. The fixed platform supports or carries a plurality of objects as well as a probe which are in a fixed relationship with one another in a frame of reference A, while the moving platform supports or carries a plurality of objects as well as a probe which are in a fixed relationship with one another in a frame of reference B. At the start, it is not known how the frames of reference A and B are related to one another.

Figure 16:
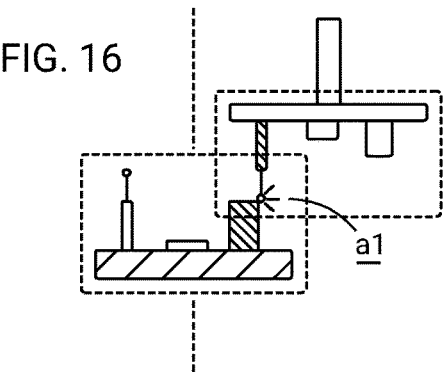

In FIG. 16, the moveable platform is moved so as to bring the moveable probe into a sensing relationship with a point (feature or corner) of one of the objects on the fixed platform. The coordinates of this point are recorded as a vector $\underline{a1}$. The coordinates can be a set of machine coordinates that defines the relative position of the platforms in that particular pose (i.e. the pose which puts the moveable probe tip into contact with that particular point on the object), for example the lengths of the respective extendible legs in a hexapod machine, or even the raw readings from the transducers 17 which are used to derive those lengths. However, in this illustration it is assumed that the coordinates $\underline{a1}$ are recorded as Cartesian X, Y, Z coordinates, having been derived (transformed) from the machine coordinates based on the known geometry of the machine, such that normal vector arithmetic applies.

Figure 17:
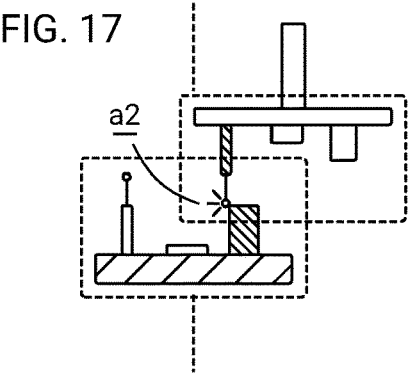
Figure 18:
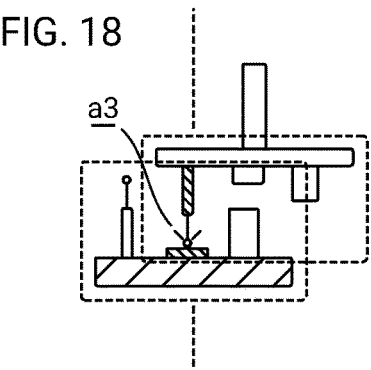
Figure 19:
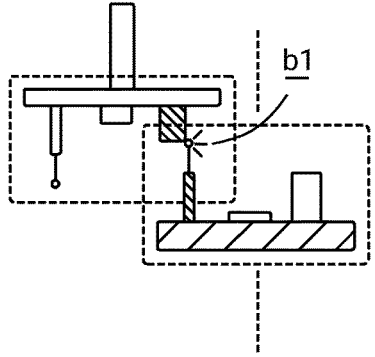
Figure 20:
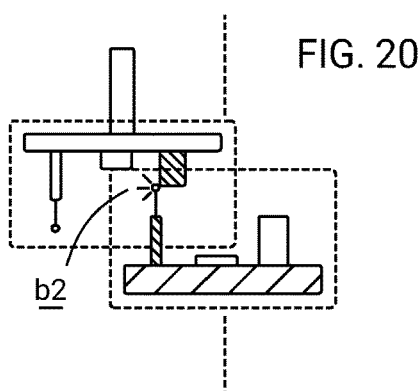
Figure 21:
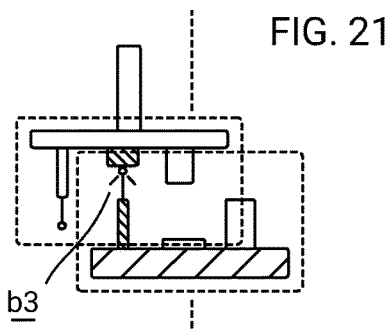

Then in FIG. 17 another point (feature or corner) of the object is sensed using the moveable probe, with point coordinates recorded as vector $\underline{a2}$. A point (feature or surface) of the other object on the fixed platform is then sensed with the moveable probe, and recorded as having point coordinates $\underline{a3}$. Following that, in FIGS. 19 to 21 the moveable platform is moved so as to bring points or features of the moveable objects into sensing a relationship with the fixed probe, resulting in point coordinates $\underline{b1}$, $\underline{b2}$ and $\underline{b3}$ respectively.

Although these point coordinates $\underline{a1}$ to $\underline{a3}$ and $\underline{b1}$ to $\underline{b3}$ are all measured within the same machine coordinate system, because it is the same set of extendable legs that is being controlled for all such measurements and each point coordinate is therefore represented by a common set of machine coordinates (e.g. set of leg lengths), it is still not known how the coordinates in one frame of reference A (or equivalently coordinate system A) relate to those in the other frame of reference B (or equivalently coordinate system B) in a global frame of reference (or coordinate system). For example, it is known how points within the same frame of reference are related spatially (e.g. $\underline{a2}$-$\underline{a1}$ is the vector from point 1 to point 2 in frame of reference A) but it is not known how points in difference frames of reference are related spatially (e.g. $\underline{b2}$-$\underline{a1}$ is not a valid consideration at this time). The relationship between the frames of reference is established in the step shown in FIG. 22.

Conceptually, the relationship is established by moving the platforms to bring the sensing point of both probe tips (i.e. their respective centres) to the same point, i.e. the same position in a global coordinate space (the coincident point). When this is determined to have happened, a link has been established between the two frames of reference A and B, allowing the various objects on both platforms to be considered and inter-related within a common frame of reference C (which may be the global frame of reference or one of the two reference frames A and B).

Figure 22:
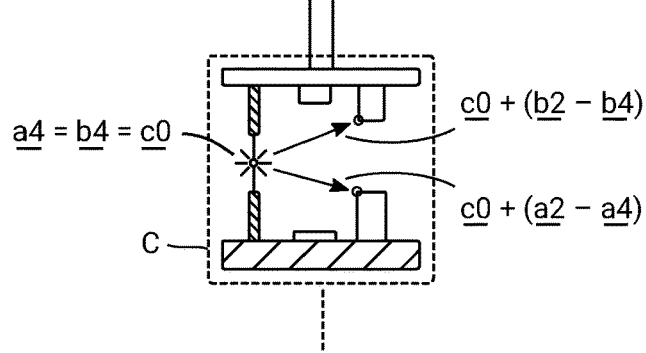

When in the coincident position as shown in FIG. 22, this point is recorded as $\underline{a4}$ in frame of reference A and as $\underline{b4}$ in frame of reference B. But this can also be recorded as point $\underline{c0}$ in the common frame of reference. The coincident point $\underline{c0}$ effectively ties the two frames of reference A and B together. Now the point $\underline{b2}$ measured in FIG. 20 can be expressed in the common frame of reference C as $\underline{c0}$+($\underline{b2}$-$\underline{b4}$), and point $\underline{a2}$ measured in FIG. 17 can be expressed in the common frame of reference C as $\underline{c0}$+($\underline{a2}$-$\underline{a4}$).

Figure 13:
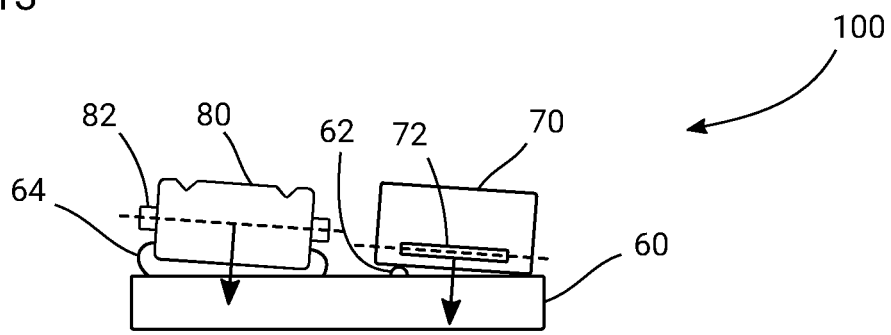
FIG. 13 is a schematic diagram showing an article resulting from the method.

Returning now to consider again the schematic illustrations of FIGS. 2 to 13, in those illustrations the first and second parts 70, 80 are shown as being arranged side-by-side on the final article (see in particular FIG. 13). The first part 70 is described as having a representative feature 72 and the second part 80 as having a representative feature 82, and it is described that it is important that, in the final article, these representative features 72, 82 are precisely positioned relative to one another. A practical application of the schematic example will now be described with reference to FIGS. 23 to 25.

Figure 23:
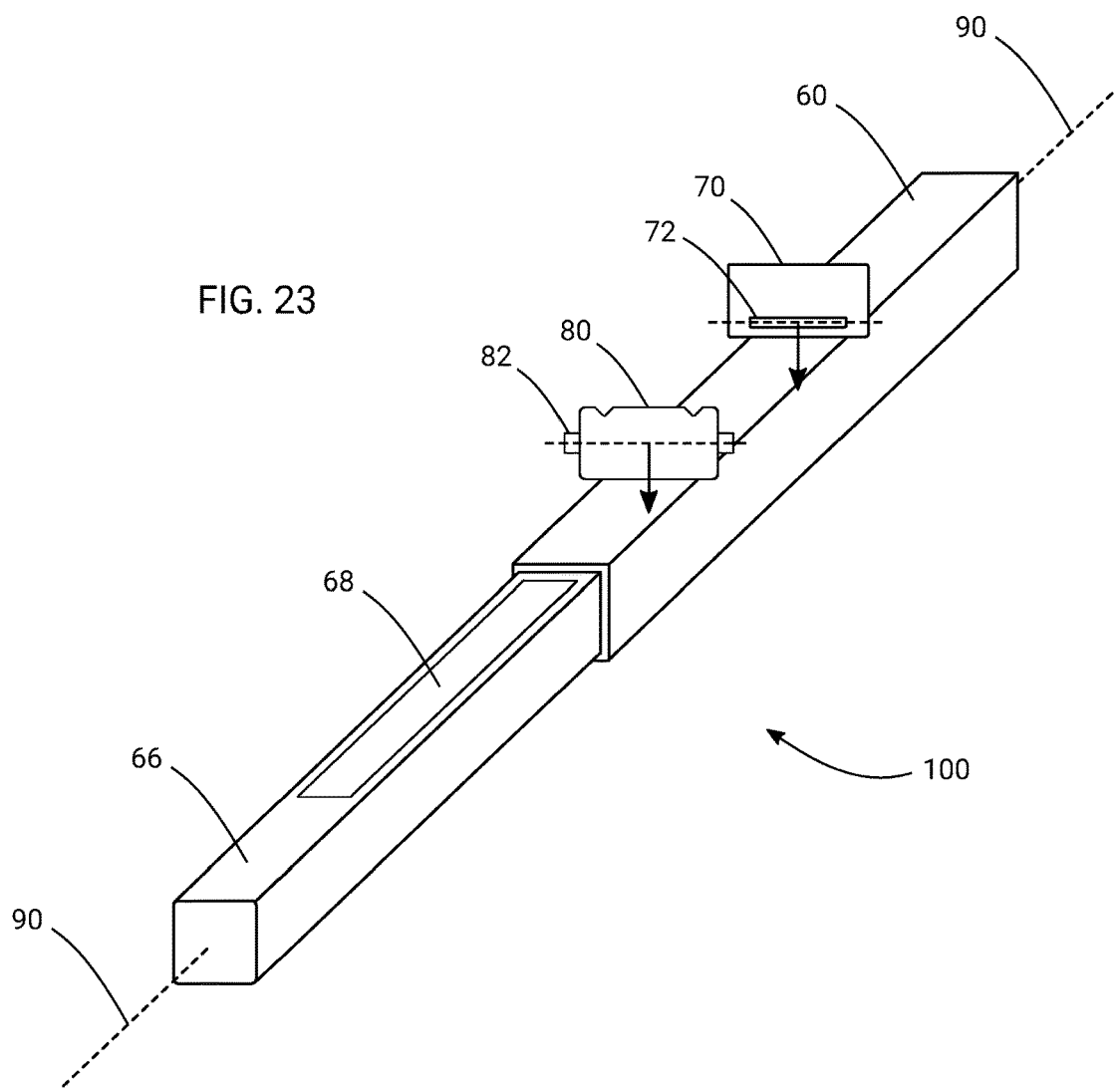
FIG. 23 illustrates a more realistic arrangement of parts of an article manufactured by a method embodying the present invention.

FIG. 23 shows a straightforward rearrangement of the parts 60, 70, 80 that make up the article 100. In the FIG. 23 representation, the base part 60 is an elongate tube (in this example having a square cross section) having a longitudinal axis 90, and the first and second parts 70, 80 are arranged in line along the longitudinal axis 90 of the base part (tube) 60. The first and second parts 70, 80 are still shown schematically, but it is now apparent that the representative features 72, 82 are aligned in a direction transverse to the longitudinal axis 90. The base part (tube) 60 constitutes a first tube 60, and the article 100 also comprises a second tube 66 (in this example also of a square cross section) which slides telescopically inside the first tube 60. The first part 70 represents a readhead of a measurement encoder of the type mentioned above in respect of FIG. 1A, and a corresponding encoder scale 68 is provided on the second tube 66.

Accordingly, the article 100 that has been manufactured by a method embodying the present inventive (as described above) corresponds to one of the extendible legs 16 described above, so that the coordinate measuring machine 10 has been used to make an extendible leg 16 for use in another such coordinate measuring machine. The second part 80 represents a bearing allows the second tube 66 to slide within the first tube 60, with the representative feature 82 being an axle of the bearing. The representative feature 72 is a sensing part of the readhead, which must in practice be aligned precisely relative to the encoder scale 68 for most accurate metrology results, and the alignment of the second tube 66 within the first tube 60 is defined by the alignment of the second part (bearing) 80. Since the method has ensured that the second part (bearing) 80 is accurately aligned with respect to the first part (readhead), the result is an accurately-formed article (extendible leg) 100 in which the encoder scale 68 runs in precise alignment with the readhead sensor 72.

A more realistic representation of a bearing assembly 800 for use in such an article 100 is shown in FIG. 24. The bearing assembly 800 corresponds to the second part 80. The bearing assembly 800 comprises a wheel 860 supported on an axle 820, with the axle 820 corresponding to the representative feature 82 described above. Kinematic locating features 840, corresponding to the v-grooves 84 described above, are provided on one side of the bearing assembly 800, with the wheel 860 protruding most prominently from the other side of the bearing assembly 800. The kinematic locating features 840 comprise two sets of three v-grooves (i.e. six in total) to allow the bearing assembly 800 to be picked up by the gripper 50 (having three balls 54) in two different orientations (or in any one of six different orientations, since with only three rotationally-symmetric v-grooves it is already possible to pick up in any one of three different orientations). FIG. 34 shows in more detail how the v-grooves 840 of the bearing assembly 800 engage kinematically with the balls 54 of the gripper 50.

FIG. 25 shows how four such bearing assemblies 800 (corresponding to four second parts 80) are assembled onto an outer tube 600 (corresponding to the base part 60), being placed partly through a corresponding number of apertures (or pockets) 610 formed in the outer tube 600. The flange 830 of the bearing assembly 800 is wider than the aperture 610 and so cannot pass through the aperture 610 and instead sits on and is supported by the outer tube 600, via the adhesive 64 that fills a gap deliberately left between the bearing assembly 800 and the outer tube 600 as described above. The wheel 860 protrudes through the aperture 610 when assembled, such that it runs along an inner tube 660 (corresponding to the inner tube 66 of FIG. 23).

The inner tube 660 has a square cross section, and there are two bearing assemblies 800 for each of two adjacent sides of the inner tube 660. The inner tube 660 is retained in contact with the bearing assemblies 800 by magnetic means, with magnets (not shown) being provided in each bearing assembly 800 and with the inner tube being formed as least partly of a magnetic material. On a third side of the inner tube 660 (just obscured in the view of FIG. 25) is provided an encoder scale 680. A readhead mounting block (or bracket) 700 is provided within an aperture 630 formed in the outer tube 600, into which mounting block 700 a readhead 710 is mounted. The mounting block 700 corresponds to the first part 70 described above, and a sensor part 720 of the readhead corresponds to the representative feature 72. An electrical cable 730 is provides power to the readhead 710 and carries sensor signals from the readhead 710.

A manufacturing method based on the specific embodiment and features shown in FIGS. 24 and 25 will now be described. This method is generally in line with what is described above with reference e.g. to FIGS. 2 to 12, though with some additional features that are relevant to the particular context of this embodiment; however these additional features could also be applied to the more general teaching above.

Firstly, the "quill offset" is determined. This involves measuring the centre of a fixed ball using the moving probe 30 with the moving platform 12 set at multiple orientations. The ball centres are used to calculate the centre of rotation of the moving platform 12. The "quill offset" value in the controller 15 is adjusted so that, when the moving platform 12 is commanded to rotate, the centre of rotation is about the moving probe tip 32.

Next, the "probe coincident position" is determined, which is where the moving probe 30 is calibrated against the stationary probe 40. The relationship between the moving probe 30 and stationary probe 40 is established by measuring one probe tip 32, 42 with the other 42, 32. This is done using touches and a sphere fit to find the centre point. The two probes 30, 40 are selected to be of different stiffness so that a known one of the two will trigger. Deflection of the styli is assumed to be symmetrical about Z so that the X-Y location is well known; the Z position is less well known (but known sufficiently).

Then the tube 600 is measured using the moving probe 30 to determine a coordinate system (or "Csys" for short) of the tube 600, which is denoted as TubeCsys. The coordinate system TubeCsys is equivalent to the frame of reference of the first part as described above, and in this context the first part comprises the tube 600 and the readhead bracket 700. The coordinate system TubeCsys is determined as follows:
(a) touches with the moving probe 30 around the tube 600 are used to find the axis of the cylinder of the tube 600;
(b) touches with the moving probe 30 at the front and back of one or more of the pockets 610 are used to determine the Z axis position of the tube 600;
(c) touches with the moving probe 30 on the side of the readhead bracket 700 are used to fit a plane and the axis of the plane used to give the orientation of the tube 600; and
(d) the measurements from (a), (b) and (c) are used to create a coordinate system TubeCsys for the tube 600 and readhead bracket 700.

Following that, a bearing assembly 800 is picked up. A kinematic pick-up feature consisting of three balls and a suction cup is used to pick up the bearing assembly 800 from the tray support 23. The bearing assembly 800 has six locations forming two sets of three v-grooves as described above.

Then the bearing assembly 800 is measured using the fixed probe 40 to give a coordinate system for the bearing assembly 800, denoted as BearingCsys. The coordinate system BearingCsys is equivalent to the frame of reference of the second part as described above. The coordinate system BearingCsys is determined as follows:
(a) the bearing axle 820 is measured using touches with the fixed probe 40 and a cylinder fitted to these measurements to determine a vector direction for the axle 820;
(b) the ends of the axle 820 are measured using touches with the fixed probe 40 to find the Z centre of the axle 820;
(c) a plane is measured using touches with the fixed probe 30 to give the orientation of the bearing assembly 800; and
(d) the measurements from (a), (b) and (c) are used to create a coordinate system BearingCsys for the bearing assembly 800.

After that, the centre of rotation of the moving platform 12 is moved to the bottom of the bearing assembly 800 (from the moving probe tip 32). To achieve this, an offset is calculated from the "coincident probe position" to the origin of BearingCsys and then offset a known distance (in this specific example this is minus 5 mm in Z) to get to the bottom of the bearing assembly 800 (i.e. at the bottom of the wheel 860); this is illustrated schematically in FIG. 26. This offset is then added to the "quill offset" in the controller 15 to move the machine rotation point to the centre of the bottom of the bearing assembly 800. The moving platform 12 can now be rotated in A, B or C axes (because the machine is non-Cartesian the moving platform 12 has A, B, C axes rather than X, Y, Z axes) and the centre of the bottom of the bearing will remain in a fixed location.

A bead of UV adhesive is then applied precisely to the tube 600 around the relevant pocket 610 by in the TubeCsys.

A coordinate transform is needed to move the bearing assembly 800 accurately into position (this is equivalent to the relationship between the first and second frames of reference as described above):

$$T = \text{BearingCsys}^{-1} \times \text{TubeCsys}$$

Where T is a 4×4 coordinate transform matrix. The concept of coordinate systems, and transforms between coordinate systems, will be well understood by the skilled person but a further explanation can be found in "Coordinate Systems and Transformations" by M. Orsag, C. Korpela, P. Oh, S. Bogdan, a chapter (pages 19 to 31) in "Aerial Manipulation", 2018, part of the "Advances in Industrial Control" book series (print ISBN 978-3-319-61020-7; online ISBN 978-3-319-61022-1; download from https:// www.springer.com/cda/content/document/cda_download-document/9783319610207-c2.pdf). By way of example, some transformation matrices and operations are shown below:

$$X \text{ rotation in } 3D: \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix}$$

$$Z \text{ rotation in } 3D: \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix}$$

$$Y \text{ rotation in } 3D: \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix}$$

$$\text{Scale in } 3D: \begin{bmatrix} Sx & 0 & 0 & 0 \\ 0 & Sy & 0 & 0 \\ 0 & 0 & Sz & 0 \\ 0 & 0 & 0 & 1 \end{bmatrix}$$

$$\text{Translation in } 3D: \begin{bmatrix} 1 & 0 & 0 & Tx \\ 0 & 1 & 0 & Ty \\ 0 & 0 & 1 & Tz \\ 0 & 0 & 0 & 1 \end{bmatrix}$$

$$\text{Matrix multiplication: } \begin{bmatrix} a & b & c & d \\ e & f & g & h \\ i & j & k & l \\ m & n & o & p \end{bmatrix} \begin{bmatrix} x \\ y \\ z \\ q \end{bmatrix} = \begin{bmatrix} x' \\ y' \\ z' \\ q \end{bmatrix}$$

Some pseudo code is provided below to illustrate some of the above steps that would take place in the controller 15.

Recall the probe coincident position:
point ProbeOffset=(point)CommonData["ProbeCoincidentPosition"];
Recall the bearing assembly co-ordinate system:
CSYS BearingCsys=(CSYS)CommonData["FrontBearingCsys"];
Calculate the offset between the bearing point centre and the moving platform probe tip and translate to the bottom of the bearing:
BearingPos=[BearingCsys.M.m30, BearingCsys.M.m31, BearingCsys.M.m32];
offset=ProbeOffset−BearingPos+[0, 0, −5];
where [0, 0, −5] in the above statement is (as mentioned above) an offset of minus 5 mm in Z.
Recall the tube coordinate system:
CSYS TubeCsys=(CSYS)CommonData["TubeCsys"];
Calculate the transform:
T=BearingCsys^1*TubeCsys;
Calculate angles.x, angles.y and angles.z from T.
Move the rotation point of the moving platform 12 to "offset":
SetTipOffset(offset);
Rotate the moving platform 12:
MoveToAngle(Angles.x, Angles.y, Angles.z, 100, 100);
Set the local coordinate to TubeCsys; this allows the machine to position in TubeCsys coordinates and having moved the quill offset to the bottom of the bearing the bottom of the bearing is now positioned:
mc.SetCsys(TubeCsys);
mc.UseLocalCsys( );

Now the bearing assembly 800 can be positioned relative to the tube coordinate system TubeCsys. It is positioned so that there is a gap between the tube 600 and the bearing assembly 800; typically a gap of around 100 µm is suitable.

The bearing assembly 800 is then cured in place. A UV light source is mounted on the moving platform 12. It is used to cure the adhesive thus freezing the bearing assembly 800 in place.

In the above-described embodiment, the second part 80 is measured with the second probe 40. In an alternative embodiment these measurements of the second part can instead be assumed or inferred from its known position and orientation relative to the first platform 12 by virtue of the repeatability and accuracy of the kinematic coupling used to support the second part 80 on the first platform 12, and from knowledge (e.g. from a CAD model of the second part 80) of the shape of the second part 80. Accordingly, in another embodiment of the present invention there is no need for a second probe 40.

In an alternative embodiment, instead of using fixed and moving touch probes, fixed and moving imaging cameras can be used instead. In order to tie the measurements from one camera with those from the other, equivalent to measuring the coincident point in the previously-described embodiment, key features on one camera (such as the sensor) could be imaged with the other camera. In order to measure in three dimensions, the imaging camera may comprise three imaging sensors arranged at different respective angles or orientations relative to the target, or three separate imaging cameras may be employed at different respective angles. Similarly, an optical measurement device such as a fringe-based system could be employed in another embodiment, in which fringes are projected onto the surface of the object or part, and in which those fringes are imaged and analysed to obtain measurements of the object or part.

As an extension to the above embodiment, the article 100 can be supported on a rotatable stage, with the rotatable stage itself being supported on the second platform 14. Positioning the first part 70 relative to the second part 80 can then include the step of controlling the machine to rotate the stage relative to the second platform 14. This enables parts to be assembled onto the article 100 on different sides or surfaces that would otherwise not be accessible, and effectively provides a system having more than six axes (or degrees of freedom) to work with, i.e. six axes (or degrees of freedom) from the coordinate measuring machine itself, plus another rotary axis provided by the rotary stage. Or there could be six degrees of freedom overall, with e.g. five being provided by the coordinate measuring machine and a sixth being provided by the rotary stage. Indeed, there could be any suitable number and combination of axes being provided by these respective parts. One or both of the article and the part being placed could also be supported via an articulating head such as the Renishaw REVO® probe head to provide additional degrees of freedom (axes).

Similarly, the second part 80 could itself be supported on a rotatable stage, with the rotatable stage for the second part 80 being supported on the first platform 12, such that positioning the first part 70 relative to the second part 80 can then include the step of controlling the machine to rotate the rotatable stage for the second part 80 relative to the first platform 12. This can be provided as well as or instead of a rotatable stage for the first part 70, and provides the system with even more manufacturing flexibility.

The measurements of the first and second parts 70, 80 are described above as being measurements in more than three degrees of freedom because they define both the position (in three translational degrees of freedom) and the orientation (in one, two or three rotational degrees of freedom) of the part (or at least key features thereof). An advantage over known systems is also provided even where the measurements are in three degrees of freedom, so that they define the position (in three translational degrees of freedom) but not the orientation (rotational degrees of freedom) of the part. In a typical PCBA manufacturing system, placement of the components is only controlled to any degree of accuracy in two degrees of freedom relative to the substrate, i.e. in X and Y relative to the substrate, because the substrate is assumed to be planar and absolute height of the component is of little importance due to the relatively large blobs of solder paste meaning that it is merely sufficient to ensure that the component is close enough to touch the solder paste.

FIG. 27 illustrates the process described above having been repeated for three second parts 80-1, 80-2 and 80-3, which are placed on the base part 60.

It is described above that the first part 70 can conveniently be considered as comprising the base part 60, so that FIGS. 3 and 4 show a single step of measuring the first part 70 (including base part 60) with the first probe 30. Indeed, in an alternative arrangement, as illustrated in FIG. 28, there is no "first part" as such, and only a base part 60, so that the "first part" in that example is just the base part 60. The "first part of the article" could be referred to herein instead as an "existing or already-assembled or already-placed part of the article", and the "second part of the article" could be referred to herein instead as a "new or to-be-assembled or to-be-placed part of the article". Furthermore, once the second part 80-0 has been assembled onto the article 100, based on measurements of the base part 60, the resulting arrangement (i.e. base part 60 and second part 80-0) can then be considered to be a "first part" (or "already-assembled part") for a subsequent step of adding another second part 80-1, based on measurements of the "first part" (i.e. base part 60 and second part 80-0). When placing the second part 80-1, the measurements used could either be just the measurements previously obtained of the base part 60, or new measurements could be obtained for the now-placed second part 80-0, or a combination of these measurements could be used. Similar considerations apply when placing further second parts 80-2 and 80-3.

With the example shown in FIG. 28, therefore, all of the parts 80-0 to 80-3 are "floating" above the base part 60, allowing those parts 80-0 to 80-3 to be placed very accurately (up to the accuracy of the coordinate measuring machine) relative to one another, unaffected by any imperfections or irregularities in the base part 60. What is more, unlike in the embodiment shown in FIG. 27, the parts 80-0 to 80-3 have not been aligned with or placed relative to a part 70 that is attached directly to the base part 60, but rather all of the parts 80-0 to 80-3 are effectively placed "free form" in their desired relative orientations and fixed/held in those relative orientations via the base part 60 and the fixing or supporting material 64 (e.g. curable adhesive or weld). This allows for a very accurate and flexible manufacturing or assembly method.

FIGS. 29 and 30 show stacked alternatives to the side-by-side arrangements of FIGS. 27 and 28 respectively, where each new second part 80 is placed on top of a previous second part 80.

As illustrated in FIG. 31, in an extension to the above-described embodiments, the finished article could be considered to be a self-contained module, such as the module 100-2 illustrated in FIG. 31, which forms part of an even greater whole (or complex product). Such a module 100-2 can be considered as a "second part" that is itself be picked up by the coordinate measuring machine and placed in a desired spatial relationship with a "first part" of the article (e.g. first part 70 and/or base part 60 and/or another such multi-part module 100-1 created in a previous series of steps) in an entirely analogous manner to what is described above. In this way a more complex product 110 can be created. FIG. 31 also illustrates a highly non-planar base part 60, and a complex arrangement of parts on the non-planar base part 60, which an embodiment of the present invention is particularly suited to handle due to the inherent measurement accuracy of the coordinate measuring machine and its ability to position parts relative to one another in more than three degrees of freedom (i.e. position and orientation).

The embodiment described above uses a curable adhesive as the fixing medium, but it is noted that welding is also suitable as a fixing process. Welding is a process that joins materials by using high heat to melt the parts together (the melted material being the fixing medium) and allowing them to cool causing fusion (the cooling process effectively activates the fixing medium). Welding is distinct from lower temperature joining techniques such as brazing and soldering, which do not melt the base metal, but these are also suitable techniques for the fixing process in an embodiment of the present invention. In addition to melting the base material, a filler material is typically added to the joint to form a pool of molten material (the weld pool; or fixing medium) that cools to form a joint that can be stronger than the base material. Pressure may also be used in conjunction with heat, or by itself, to produce a weld. Many different energy sources can be used for welding, including a gas flame (chemical), an electric arc (electrical), a laser, an electron beam, friction, and ultrasound.

Reference has been made to a coordinate measuring machine having a plurality of length-measuring (or distance-measuring or displacement-measuring) transducers, such as the length-measuring transducers 17 shown in FIG. 1A. Such length-measuring transducers are used to measure relative motion in a linear joint, providing a measure of relative movement between two parts of the machine. A coordinate measuring machine may also comprise one or more rotary joints, and therefore may also have one or more corresponding angle-measuring transducers; this would be the case for example when the coordinate measuring machine is in the form of an articulated arm having a plurality of rotary joints arranged in series (similar to a machine commonly referred to as a robot arm). If such a serial kinematic coordinate measuring machine is employed, to avoid inaccuracies typically associated with a serial kinematic arrangement of axes, it would benefit from employing a machine architecture as disclosed in UK patent application no. 1918165.0. The various length- and angle-measuring transducers can be referred to collectively as measurement transducers. The outputs of these measurement transducers can be considered to be, or can be used to derive, machine coordinates for any particular configuration or pose of the machine (e.g. relative positioning of the platforms 12 and 14 of FIG. 1A). The outputs of the measurement transducers are used both when determining or reading the configuration (pose) the machine (for a measurement operation) and when setting or changing the configuration (pose) of the machine (for a positioning operation).

One example application of a manufacturing method embodying the present invention is described above, in which the coordinate measuring machine is used to make an extendible leg for use in another such coordinate measuring machine. Another example application for a manufacturing method embodying the present invention is for the manufacture of a stylus for a measurement probe such as the probe 30 described above and as illustrated in FIG. 2.

Such an application will be described with reference to FIG. 32, which is a schematic illustration similar to that shown in FIG. 26, but adapted for the manufacture of a stylus rather than an extendible leg. The stylus has a stem 310 to which a stylus tip (or ball) 320 is to be affixed; the diameter of the stylus ball 320 may be as small as 2 μm. It is desirable for the stylus tip 320 to be positioned as accurately (and concentrically) as possible on the stem 310.

The basic methodology is equivalent to that described above, so will not be described again in detail here. FIG. 32 differs from FIG. 26 by having a different type of gripper, which in the FIG. 32 embodiment is in the form of a suction tube 500. The suction tube 500 has an internal channel 510 through which air can be sucked, thereby drawing and holding the stylus tip 320 into a cup 520 on the end of the suction tube 500. The internal surface of the cup 520 may have kinematic features 530 to enable the ball 320 to sit in a predictable and repeatable position within the cup; for example, three protrusions (from a concave part-spherical surface) would be suitable as the kinematic features, as is illustrated most clearly in dotted outline A of FIG. 32. This forms a kind of tripod arrangement, which is very stable and allows the ball 320 to sit predictably within the cup 520. The three point-like contacts create three constraints, which is no more and no less than what is required (thereby fulfilling the kinematic design considerations by avoiding over constraint). With three constraints, the ball 320 is thereby constrained in three translational degrees of freedom, but is free to rotate around its centre in three rotational degrees of freedom; this does not matter because the ball 320 is spherically symmetric.

As in previous embodiments, having measured the end of the stem 310 with the moving probe 30, a blob of curable adhesive (or brazing paste) 640 is applied to the end of the stem 310, taking account of the measurements of the stem 310 obtained with probe 30. The ball 320 is then located accurately relative to the stem 310 using the method as described previously, again taking account of the measurements of the stem 310 obtained with probe 30. Preferably a gap is maintained between the ball 320 and stem 310, with the machine still holding the parts relative to one another, while the adhesive 640 is cured. This results in a stylus as shown in the left-hand illustration included within dotted outline B of FIG. 32.

It is also possible to partly (rather than fully) cure the adhesive 640 while the relative position is maintained by the machine, for example by blowing warm air for a short time onto the curable adhesive; this would then be followed be a full curing (sintering) operation, with the machine having already released the ball 320, and with the partly-cured adhesive 640 having sufficient strength or holding power to hold the ball 320 in a fixed position relative to the stem 310 whilst the part is transferred to the sintering station and sintered (fully cured). It is also possible that the adhesive 640 has sufficient holding power to hold the parts in the fixed relative position even without first being partly cured.

Since in this example the orientation of the ball 320 on the stem 310 does not matter (because the ball is spherical) it is not essential to leave a gap between the ball 320 and stem 310; instead, the ball 320 could be positioned so as to touch the end of the stem 310, as shown in the right-hand illustration included within dotted outline B of FIG. 32. What matters most in this example application is that the ball 320 is positioned concentrically with the stem 310; in other words, the radial positioning of the ball 320 relative to the longitudinal axis of the stem 310 matters more than the positioning along the longitudinal axis of the stem 310.

From the above it will be apparent that it is not always necessary for there to be a gap left all around the part being placed onto the article, or even a gap at all. For example, an embodiment of the present application also finds use for accurately assembling a part very accurately and with very tight tolerances onto an article, to engage the part with a corresponding part or feature on the article, without necessarily leaving any gap. This might be the case, for example, where a part having a cylindrical protrusion is located tightly into or onto an article having a cylindrical recess or bore, with the protrusion sitting neatly and tightly within (and touching) the recess. The present invention provides a novel approach to this assembly process, in which a coordinate measuring machine is used both to obtain three-dimensional measurements of a feature of the article (e.g. the cylindrical recess) and to use multiple-axis positioning (e.g. four-, five- or six-axis positioning) to locate a feature of a part (e.g. the cylindrical protrusion) in a predetermined spatial relationship (in multiple degrees of freedom) relative to the feature of the article based on those measurements.

It will be appreciated that there may be a gap left in some places around the part being placed, but not in others; for example if the orientation of the part relative to the surface of the article is important, and not the height above the surface of the article, then the part could be placed so as to touch the article at a point (or multiple points), but still held and fixed in a desired orientation relative to the article. This is illustrated in FIG. 33, which differs from FIG. 13 only in that the second part 80 is positioned so as to touch the base part 60 at the point circled, but is left proud of the base part 60 elsewhere; in other words it is not that case that there is a gap all around the second part 80. This means that the height of the second part 80 above the base part 60 will be subject to imperfections in the surface, such as bump 62, but its orientation relative to the base part 60 (and other already-placed parts such as the first part 70) can still be controlled.

It will be appreciated that operation of the coordinate measuring machine 10 can be controlled by a program operating on the machine 10, and in particular by a program operating on a coordinate measuring machine controller such as the controller 15 illustrated schematically in FIG. 1A. It will be appreciated that control of the extendable legs can be provided by a program operating on the controller 15. Such an operating program can be stored on a computer-readable medium, or could, for example, be embodied in a signal such as a downloadable data signal provided from an Internet website. The appended claims are to be understood as covering an operating program by itself, or as a record on a carrier, or as a signal, or in any other form.

The invention claimed is:

1. A method of manufacturing an article, comprising
using a coordinate measuring machine both to obtain measurements of a first part of the article that is already in place and to position a second part of the article in a predetermined spatial relationship relative to the first part in dependence upon the measurements of the first part;
using the coordinate measuring machine to obtain measurements of the second part, with the second part being positioned in the predetermined spatial relationship relative to the first part in dependence upon the measurements of the first and second parts;

using the measurements of the first part to establish a first frame of reference for the first part;
using the measurements of the second part to establish a second frame of reference for the second part;
establishing a relationship between the first frame of reference and the second frame of reference; and
using the established relationship to move the first and second parts into the predetermined spatial relationship in a common frame of reference.

2. A method as claimed in claim 1, wherein establishing the relationship between the first frame of reference and the second frame of reference comprises determining positional information relating to at least one point or feature that is common to or coincident in both frames of reference.

3. A method as claimed in claim 1, wherein the first frame of reference and the second frame of reference are first and second coordinate systems respectively, and wherein the established relationship is a coordinate transform between the first and second coordinate systems.

4. A method as claimed in claim 1, wherein the predetermined spatial relationship is defined in more than three degrees of freedom.

5. A method as claimed claim 1, wherein the measurements are at least one of: three-dimensional measurements; coordinate measurements; and point coordinate measurements.

6. A method as claimed in claim 1, wherein the measurements are or include machine coordinates or coordinates derived therefrom.

7. A method as claimed in claim 1, wherein the measurements and the positioning of the second part are based on the same machine coordinate system.

8. A method as claimed in claim 1, wherein positioning the second part in the predetermined spatial relationship relative to the first part comprises calculating a set of machine coordinates, in dependence upon the measurements, which will position the first and second parts into the predetermined spatial relationship, and controlling the machine to adopt the calculated machine coordinates.

9. A method as claimed in claim 1, comprising applying a fixing medium that is in contact with the second part when in the predetermined spatial relationship with the first part, and activating the fixing medium to fix the first and second parts in the predetermined spatial relationship.

10. A method as claimed in claim 9, comprising applying the fixing medium before moving the first and second parts into the predetermined spatial relationship, and then activating the fixing medium when the first and second parts are in the predetermined spatial relationship.

11. A method as claimed in claim 9, wherein the fixing medium is a curable adhesive, and wherein activating the fixing medium comprises curing the adhesive.

12. A method as claimed in claim 9, comprising: using the coordinate measuring machine to obtain measurements of the second part, with the second part being positioned in the predetermined spatial relationship relative to the first part in dependence upon the measurements of the first and second parts; using the measurements of the first part to establish a frame of reference for the first part; using the measurements of the second part to establish a frame of reference for the second part; establishing a relationship between the first frame of reference and the second frame of reference; using the established relationship to move the first and second parts into the predetermined spatial relationship in a common frame of reference; and using the established relationship to determine where to apply the fixing medium.

13. A method as claimed in claim 1, comprising using a measuring device other than a probe to obtain the measurements.

14. A method as claimed in claim 1, comprising repeating the method for one or more additional second parts of the article, wherein the first part in each repeat performance of the method is any part or parts of the article resulting from any previous performance of the method.

15. A method of manufacturing an article having a plurality of parts, comprising:
for a first selected part of the plurality, performing at least the measurement and positioning steps of a method as claimed in claim 1 to position the first selected part on the article, and
for each subsequent selected part of the plurality, performing at least the positioning step and optionally also the measurement step of a method as claimed in claim 1 to position the subsequent selected part on the article, with the positioning step using measurements obtained when performing the method for the current and/or for any previous selected part.

16. A method of manufacturing an article, comprising
using a coordinate measuring machine both to obtain measurements of a first part of the article that is already in place, and
using the coordinate measuring machine to position a second part of the article in a predetermined spatial relationship relative to the first part in dependence upon the measurements of the first part,
wherein the coordinate measuring machine comprises a plurality of measurement transducers, with the same plurality of measurement transducers being used for obtaining the measurements and for positioning of the second part based on those measurements.

17. A method of manufacturing an article, comprising
using a coordinate measuring machine both to obtain measurements of a first part of the article that is already in place and to position a second part of the article in a predetermined spatial relationship relative to the first part in dependence upon the measurements of the first part, and
controlling the machine to hold the first and second parts in the predetermined spatial relationship while performing an operation to fix the first and second parts in the predetermined spatial relationship.

18. A method as claimed in claim 17, wherein positioning the second part in the predetermined spatial relationship relative to the first part comprises calculating a set of machine coordinates, in dependence upon the measurements, which will position the first and second parts into the predetermined spatial relationship, and controlling the machine to adopt the calculated machine coordinates, and wherein controlling the machine to hold the first and second parts in the predetermined spatial relationship comprises controlling the machine to maintain the calculated machine coordinates.

19. A method of manufacturing an article, comprising
using a coordinate measuring machine both to obtain measurements of a first part of the article that is already in place, and
using the coordinate measuring machine to position a second part of the article in a predetermined spatial relationship relative to the first part in dependence upon the measurements of the first part, and
leaving a gap between the second part and any other part of the article when in the predetermined spatial relationship.

20. A method as claimed in claim 19, comprising applying a fixing medium that is in contact with the second part when in the predetermined spatial relationship with the first part, and activating the fixing medium to fix the first and second parts in the predetermined spatial relationship, wherein the gap is at least partly bridged by the fixing medium.

21. A method of manufacturing an article, comprising
using a coordinate measuring machine both to obtain measurements of a first part of the article that is already in place and to position a second part of the article in a predetermined spatial relationship relative to the first part in dependence upon the measurements of the first part, wherein the machine comprises first and second platforms moveable relative to one another, and
supporting the first part on the second platform and supporting the second part on the first platform, wherein positioning the second part relative to the first part comprises controlling the machine to move the first and second platforms relative to one another.

22. A method as claimed in claim 21, wherein supporting the second part on the first platform comprises picking up the second part using a pick-up device supported on the first platform.

23. A method as claimed in claim 21, wherein the first platform is a moveable platform and the second platform is a fixed platform.

24. A method as claimed in claim 21, comprising measuring the first part using a first probe supported on the first platform.

25. A method as claimed in claim 24, wherein measuring the first part with the first probe comprises moving the first and second platforms relative to one another to bring the first probe into a sensing relationship with the first part.

26. A method as claimed in claim 24, comprising: using the coordinate measuring machine to obtain measurements of the second part, with the second part being positioned in the predetermined spatial relationship relative to the first part in dependence upon the measurements of the first and second parts; and measuring the second part using a second probe supported on the second platform.

27. A method as claimed in claim 26, comprising: using the measurements of the first part to establish a frame of reference for the first part; using the measurements of the second part to establish a frame of reference for the second part; establishing a relationship between the first and second frames of reference; using the established relationship to move the first and second parts into the predetermined spatial relationship in a common frame of reference; and measuring the first probe with the second probe and/or vice versa to establish the relationship between the first and second frames of reference.

28. A method as claimed in claim 27, wherein measuring the first probe with the second probe and/or vice versa comprises moving the first and second platforms relative to one another to bring the first and second probes into a sensing relationship with one another.

29. A method as claimed in claim 26, comprising: using the measurements of the first part to establish a frame of reference for the first part; using the measurements of the second part to establish a frame of reference for the second part; establishing a relationship between the first and second frames of reference; and using the established relationship to move the first and second parts into the predetermined spatial relationship in a common frame of reference; wherein establishing the relationship between the first and second frames of reference comprises determining positional information relating to at least one point or feature that is common to or coincident in both frames of reference; and wherein the first and second probes each comprise a stylus tip and wherein the common or coincident point is the centre point of the stylus tip of the first and second probes when the first and second platforms are in a position relative to one another which would place the stylus tips of the first and second probes in the same position.

30. A method as claimed in claim 24, wherein measuring the second part with the second probe comprises moving the first and second platforms relative to one another to bring the second probe into a sensing relationship with the second part.

31. A method as claimed in claim 24, wherein the second part and the first probe are supported simultaneously on the first platform.

32. A method of manufacturing an article, comprising
using a coordinate measuring machine both to obtain measurements of a first part of the article that is already in place, and
using the coordinate measuring machine to position a second part of the article in a predetermined spatial relationship relative to the first part in dependence upon the measurements of the first part,
wherein the first and second parts are operative parts of the article having a function in use of the article.

33. A method of manufacturing an article, comprising
using a coordinate measuring machine both to obtain measurements of a first part of the article that is already in place, and
using the coordinate measuring machine to position a second part of the article in a predetermined spatial relationship relative to the first part in dependence upon the measurements of the first part,
wherein the coordinate measuring machine is at least one of: a non-Cartesian coordinate measuring machine; a parallel kinematic coordinate measuring machine; a coordinate measuring machine comprising a plurality of extendable legs; and a hexapod coordinate measuring machine comprising six extendable legs.

34. A method as claimed in claim 33, wherein the machine coordinates of the coordinate measuring machine comprise values relating respectively to the lengths of the plurality of extendable legs.

35. A method as claimed in claim 33, wherein the coordinate measuring machine comprises a plurality of measurement transducers, with the same plurality of measurement transducers being used for obtaining the measurements and for positioning of the second part based on those measurements, and wherein the plurality of measurement transducers are associated respectively with the plurality of extendible legs.

36. A manufacturing system or apparatus comprising a coordinate measuring machine configured to perform a method of manufacturing an article, comprising
using the coordinate measuring machine both to obtain measurements of a first part of the article that is already in place and to position a second part of the article in a predetermined spatial relationship relative to the first part in dependence upon the measurements of the first part.

37. A non-transitory computer-readable medium having stored therein instructions that, when executed, cause a coordinate measuring machine to perform a method of manufacturing an article where the coordinate measuring machine both obtains measurements of a first part of the article that is already in place and positions a second part of the article in a predetermined spatial relationship relative to the first part in dependence upon the measurements of the first part.

* * * * *